(12) United States Patent
Rajasingham

(10) Patent No.: US 9,902,298 B1
(45) Date of Patent: Feb. 27, 2018

(54) VEHICLE OCCUPANT SUPPORT

(71) Applicant: Arjuna Indraeswaran Rajasingham, Bethesda, MD (US)

(72) Inventor: Arjuna Indraeswaran Rajasingham, Bethesda, MD (US)

(*) Notice: Subject to any disclaimer, the term of this patent is extended or adjusted under 35 U.S.C. 154(b) by 36 days.

(21) Appl. No.: 14/600,932

(22) Filed: Jan. 20, 2015

Related U.S. Application Data

(60) Continuation-in-part of application No. 13/507,149, filed on Jun. 9, 2012, now Pat. No. 9,150,127, which is a continuation-in-part of application No. 11/639,088, filed on Dec. 14, 2006, now Pat. No. 8,251,444, which is a continuation-in-part of application No. 11/113,028, filed on Apr. 25, 2005, now Pat. No. 8,138,908, which is a continuation-in-part of application No. 10/109,674, filed on Apr. 1, 2002, now Pat. No. 7,159,923, which is a continuation-in-part of application No. 09/779,591, filed on Feb. 9, 2001, now Pat. No. 6,609,754, and a continuation-in-part of application No. 09/779,592, filed on Feb. 9, 2001, now Pat. No. 6,742,833, and a continuation-in-part of application No. 09/779,593, filed on Feb. 9, 2001, now Pat. No. 6,715,816, and a continuation-in-part of application No. 09/779,594, filed on Feb. 9, 2001, now Pat. No. 7,255,389, and a continuation-in-part of application No. 09/435,830, filed on Nov. 8, 1999, now Pat. No. 6,609,749, and a continuation-in-part of application No. 09/404,475, filed on Sep. 24, 1999, now Pat. No. 6,547,315, said application No. 11/113,028 is a continuation-in-part of application No. 10/681,304, filed on Oct. 9, 2003, now Pat. No. 7,175,221, which (Continued)

(51) Int. Cl.
| | |
|---|---|
| *B60N 2/28* | (2006.01) |
| *B60N 2/42* | (2006.01) |
| *B60R 21/207* | (2006.01) |
| *B60R 21/233* | (2006.01) |
| *B60R 21/055* | (2006.01) |
| *B60R 21/231* | (2011.01) |
| *B60R 21/239* | (2006.01) |
| *B60R 21/00* | (2006.01) |

(52) U.S. Cl.
CPC ......... *B60N 2/2884* (2013.01); *B60N 2/2851* (2013.01); *B60N 2/4235* (2013.01); *B60R 21/055* (2013.01); *B60R 21/2072* (2013.01); *B60R 21/233* (2013.01); *B60R 21/239* (2013.01); *B60R 21/23138* (2013.01); *B60R 2021/0006* (2013.01); *B60R 2021/006* (2013.01); *B60R 2021/23146* (2013.01)

(58) Field of Classification Search
CPC .. B60N 2/2884; B60N 2/2872; B60N 2/2851; B60R 2021/0407; B60R 2021/23324
USPC .............. 297/216.1, 216.11, 216.12, 216.13
See application file for complete search history.

(56) References Cited

U.S. PATENT DOCUMENTS

| | | |
|---|---|---|
| 1,331,359 A | 2/1920 | Parrott |
| 2,777,502 A | 1/1957 | Travis |

(Continued)

FOREIGN PATENT DOCUMENTS

| | | |
|---|---|---|
| DE | 4335778 | 4/1995 |
| EP | 903289 | 3/1999 |

*Primary Examiner* — Sarah B McPartlin

(57) ABSTRACT

A system of air cushions to protect during impact, an occupant in a vehicle seat comprising elements for protection of the head and neck.

19 Claims, 41 Drawing Sheets

Related U.S. Application Data is a division of application No. 09/779,592, and a continuation-in-part of application No. 10/279,171, filed on Oct. 24, 2002, now Pat. No. 7,156,416, said application No. 09/779,594 is a continuation-in-part of application No. 09/404,475, said application No. 11/639,088 is a continuation-in-part of application No. 11/185,784, filed on Jul. 21, 2005, now Pat. No. 8,020,658, and a continuation-in-part of application No. 10/279,171, and a continuation-in-part of application No. 09/779,594, said application No. 11/113,028 is a continuation-in-part of application No. 10/279,171, which is a division of application No. 09/404,475, and a division of application No. 09/435,830, said application No. 11/113,028 is a continuation-in-part of application No. 09/779,594, which is a continuation-in-part of application No. 09/435,830, said application No. 11/639,088 is a continuation-in-part of application No. 10/681,304, said application No. 13/507,149 is a continuation-in-part of application No. 13/138,183, filed as application No. PCT/US2010/000237 on Jan. 28, 2010, now Pat. No. 9,174,555, said application No. 13/507,149 is a continuation-in-part of application No. 12/735,146, filed as application No. PCT/US2009/000342 on Jan. 21, 2009, now Pat. No. 8,763,954, said application No. 13/507,149 is a continuation-in-part of application No. 12/451,317, filed as application No. PCT/US2008/005810 on May 7, 2008, now Pat. No. 8,864,229.

(60) Provisional application No. 60/751,305, filed on Dec. 19, 2005, provisional application No. 60/848,804, filed on Sep. 29, 2006, provisional application No. 60/849,685, filed on Oct. 5, 2006, provisional application No. 60/226,570, filed on Aug. 21, 2000, provisional application No. 60/195,298, filed on Apr. 10, 2000, provisional application No. 60/338,466, filed on Dec. 3, 2001, provisional application No. 60/332,419, filed on Nov. 14, 2001, provisional application No. 60/286,629, filed on Apr. 26, 2001, provisional application No. 60/282,105, filed on Apr. 9, 2001, provisional application No. 60/280,470, filed on Apr. 2, 2001, provisional application No. 60/461,434, filed on Apr. 10, 2003, provisional application No. 61/276,298, filed on Sep. 9, 2009, provisional application No. 61/214,672, filed on Apr. 27, 2009, provisional application No. 61/215,559, filed on May 7, 2009, provisional application No. 61/206,205, filed on Jan. 28, 2009, provisional application No. 61/211,191, filed on Mar. 27, 2009, provisional application No. 61/270,808, filed on Jul. 14, 2009, provisional application No. 61/208,445, filed on Feb. 24, 2009, provisional application No. 61/062,002, filed on Jan. 23, 2008, provisional application No. 61/066,372, filed on Feb. 20, 2008, provisional application No. 61/072,241, filed on Mar. 28, 2008, provisional application No. 61/072,495, filed on Mar. 31, 2008, provisional application No. 61/123,345, filed on Apr. 8, 2008, provisional application No. 61/188,175, filed on Aug. 7, 2008, provisional application No. 61/191,309, filed on Sep. 8, 2008, provisional application No. 61/198,541, filed on Nov. 6, 2008, provisional application No. 61/006,074, filed on Dec. 17, 2007, provisional application No. 60/960,620, filed on Oct. 5, 2007, provisional application No. 60/960,067, filed on Sep. 13, 2007, provisional application No. 60/962,077, filed on Jul. 26, 2007, provisional application No. 60/298,040, filed on Jun. 13, 2001.

(56) References Cited

U.S. PATENT DOCUMENTS

| | | | |
|---|---|---|---|
| 3,232,665 A | | 2/1966 | Von Wimpersberg |
| 4,328,945 A | * | 5/1982 | Perkins ............... B29C 45/44 249/64 |
| 4,834,420 A | | 5/1989 | Sankrithi |
| 4,890,885 A | * | 1/1990 | Grossmann .......... A47C 27/086 264/222 |
| 4,919,483 A | | 4/1990 | Horkey |
| 5,098,124 A | | 3/1992 | Breed |
| 5,141,279 A | * | 8/1992 | Weller ............... B60R 21/0428 280/751 |
| 5,316,336 A | | 5/1994 | Taguchi |
| 5,382,051 A | | 1/1995 | Glance |
| 5,445,430 A | | 8/1995 | Nichols |
| 5,531,470 A | | 7/1996 | Townsend |
| 5,556,169 A | * | 9/1996 | Parrish ................. A42B 3/121 297/452.28 |
| 5,599,042 A | | 2/1997 | Shyr |
| 5,865,462 A | | 2/1999 | Robins |
| 5,913,536 A | | 6/1999 | Brown |
| 6,056,316 A | | 5/2000 | Yamaji |
| 6,299,199 B1 | | 10/2001 | Bowers |
| 6,609,749 B1 | | 8/2003 | Rajasingham |
| 7,234,771 B2 | * | 6/2007 | Nakhla ............... B60N 2/2845 297/219.12 |
| 7,293,828 B2 | * | 11/2007 | Yoshida ............... B60N 2/2851 280/730.1 |

\* cited by examiner

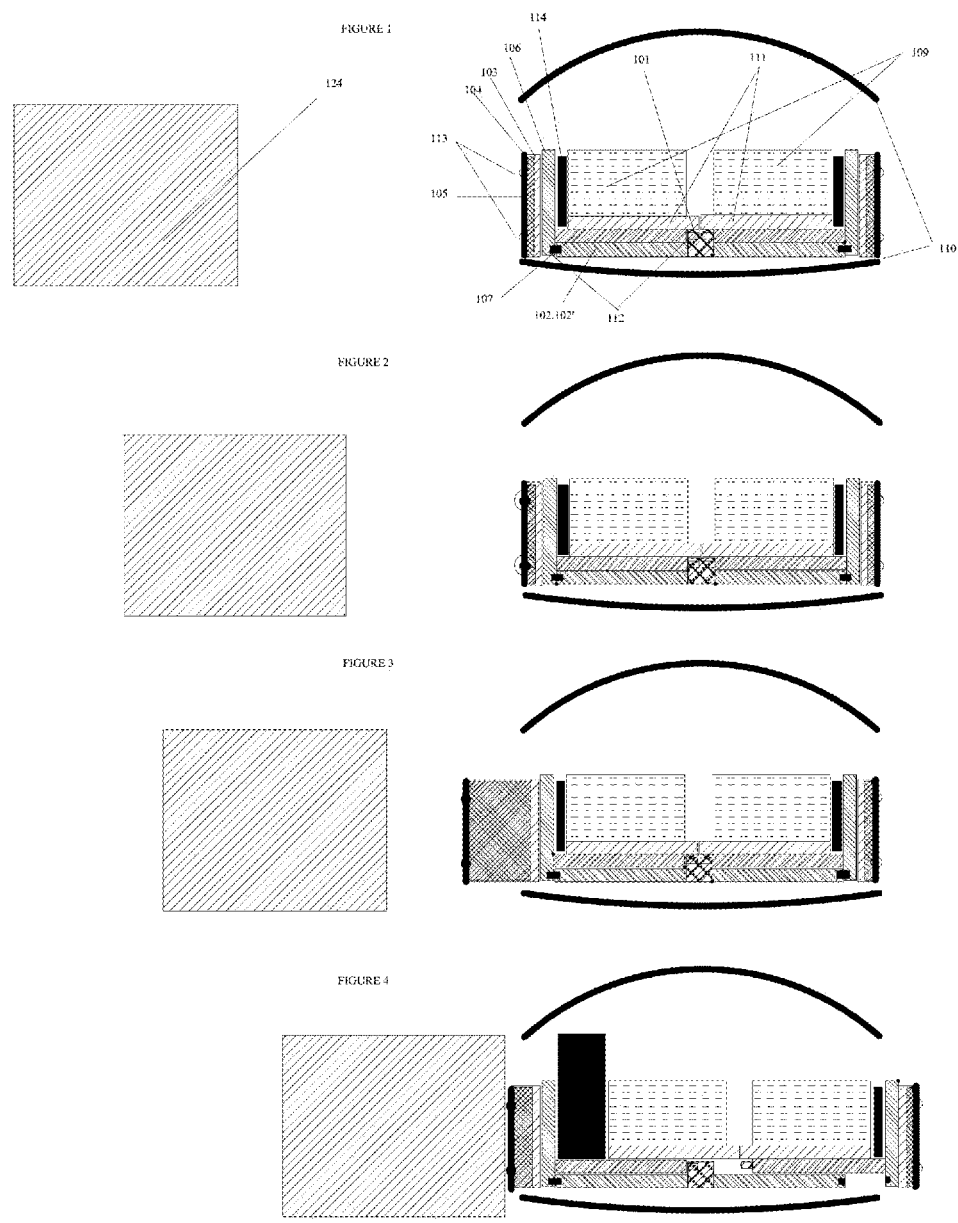

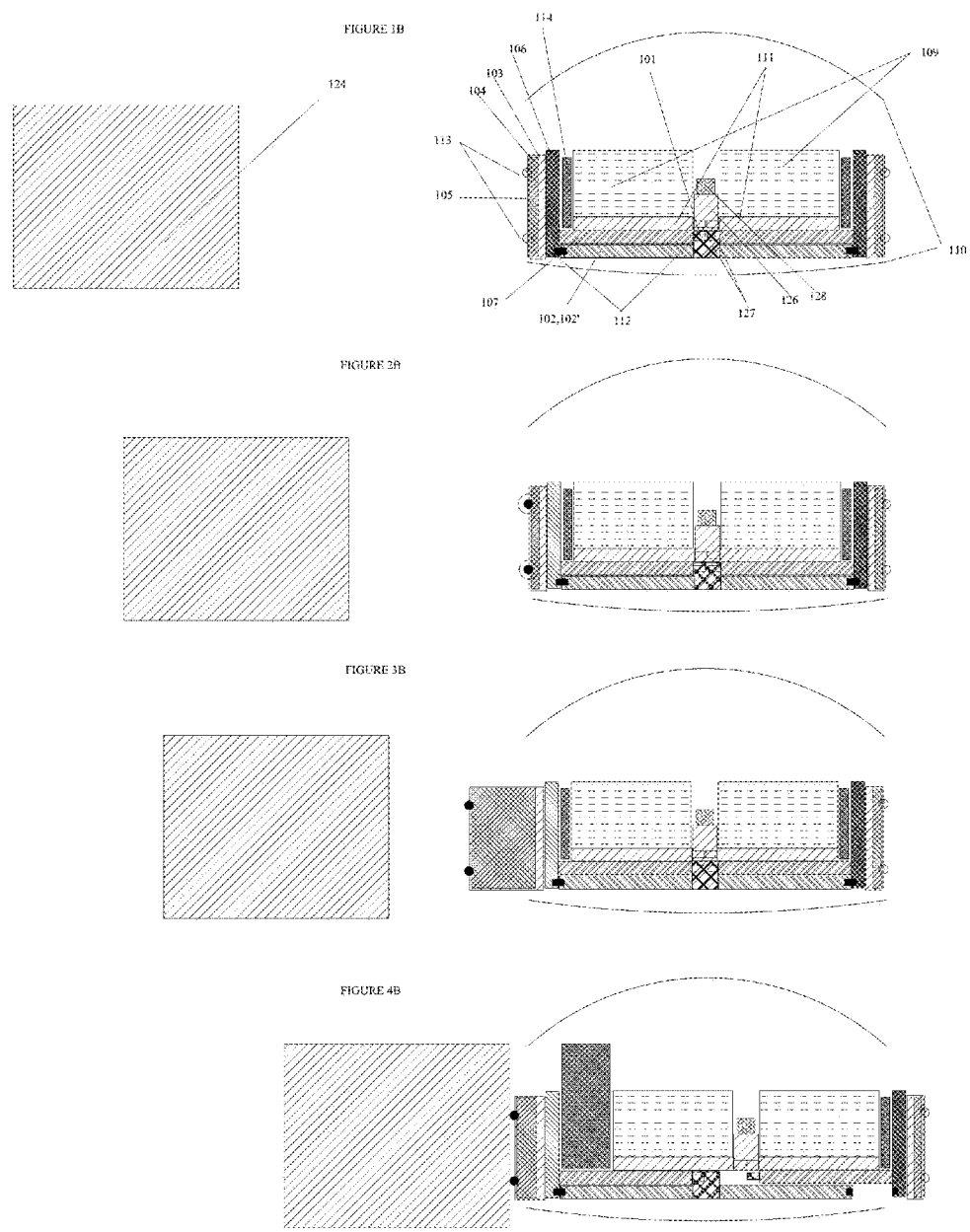

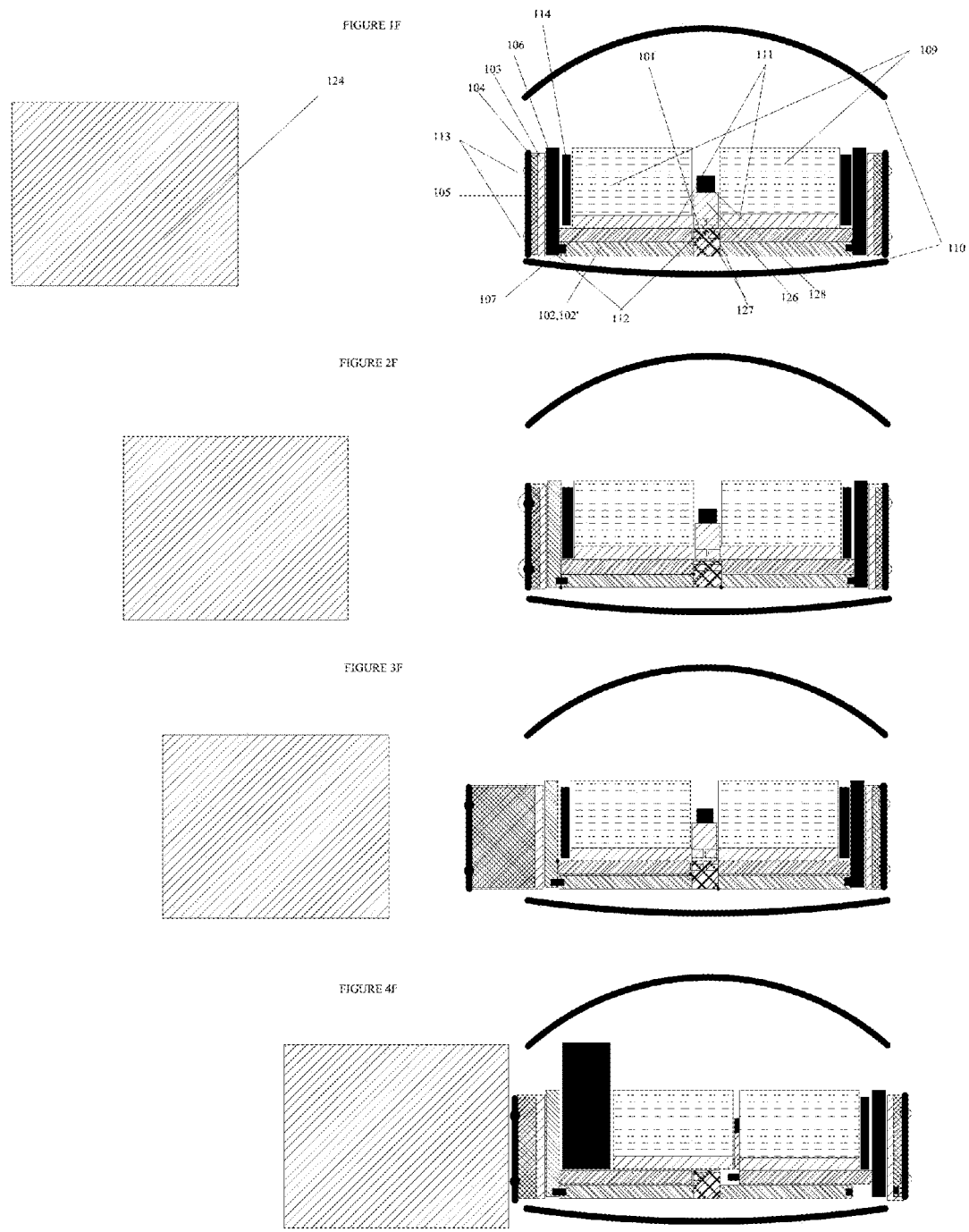

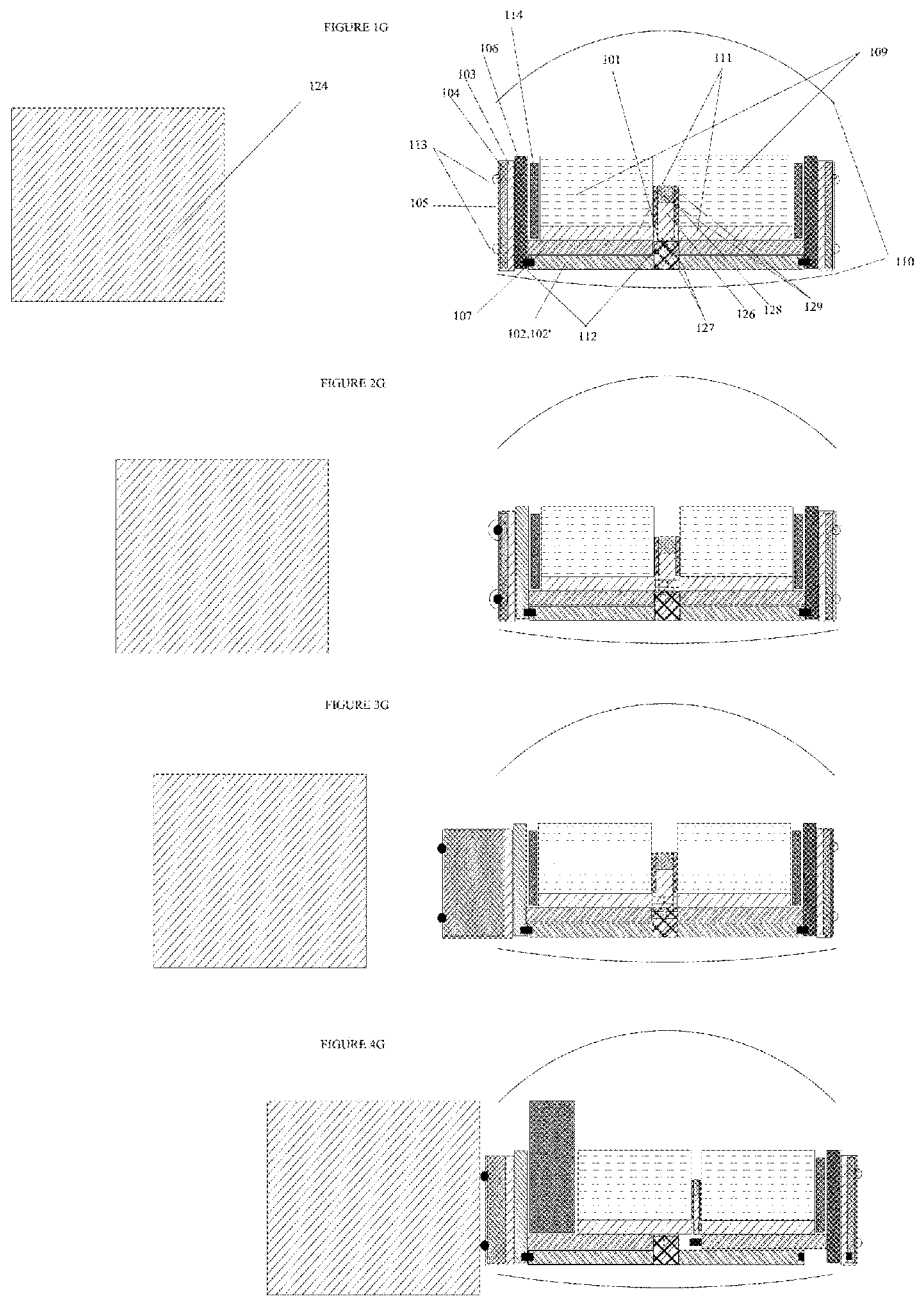

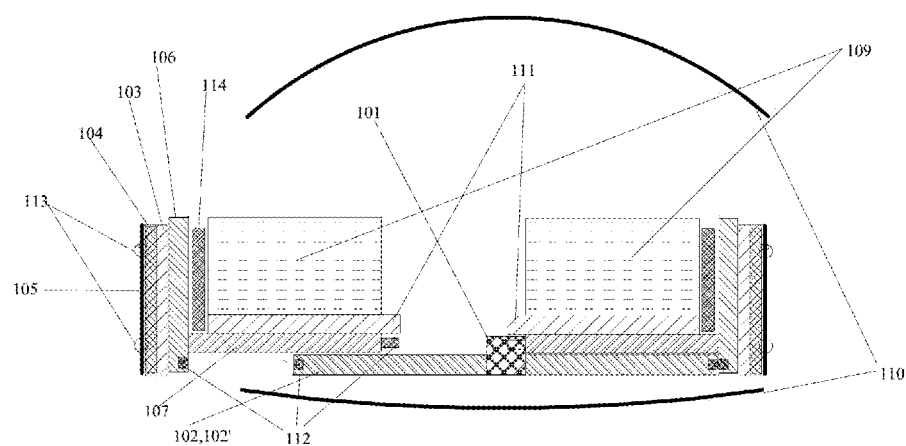
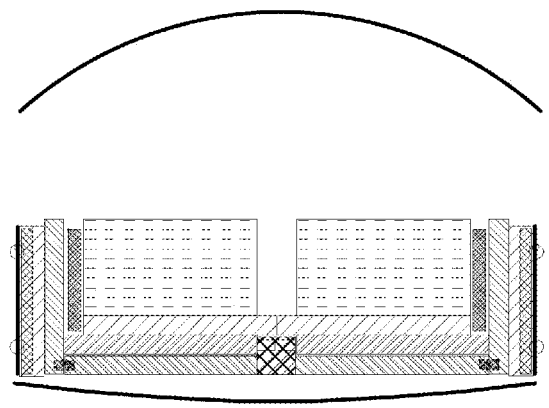

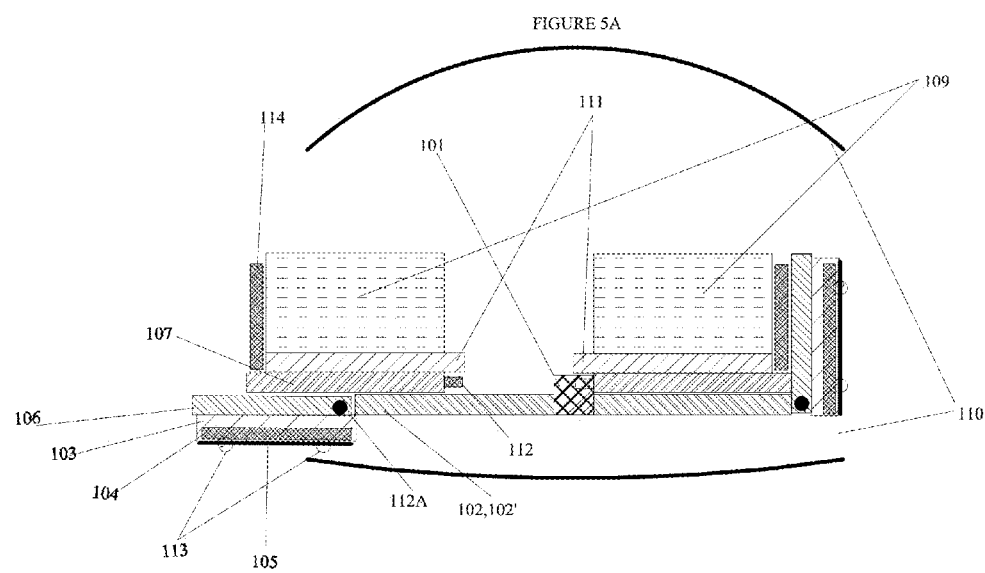
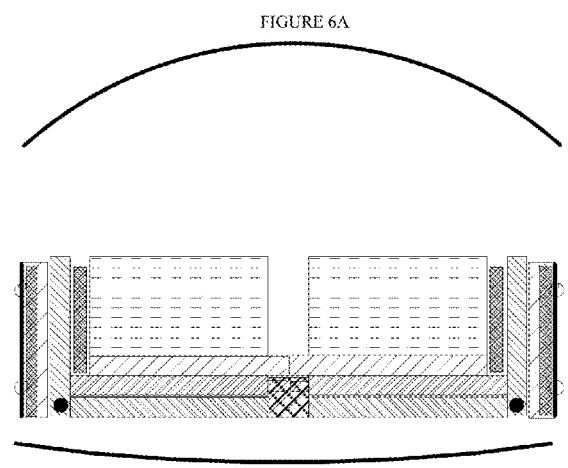

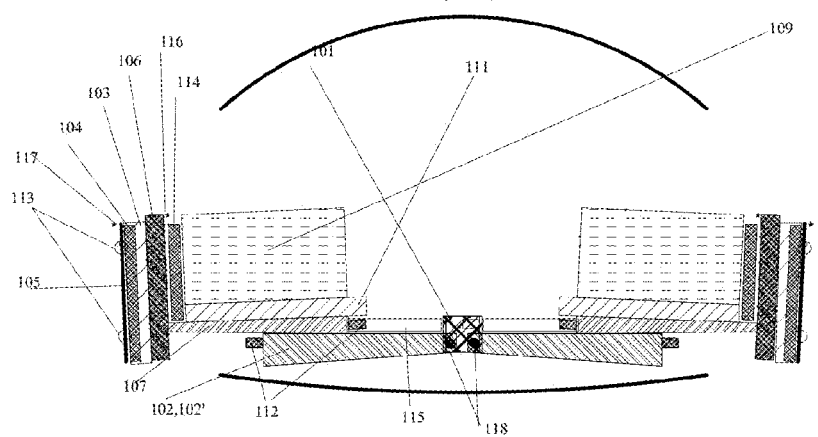
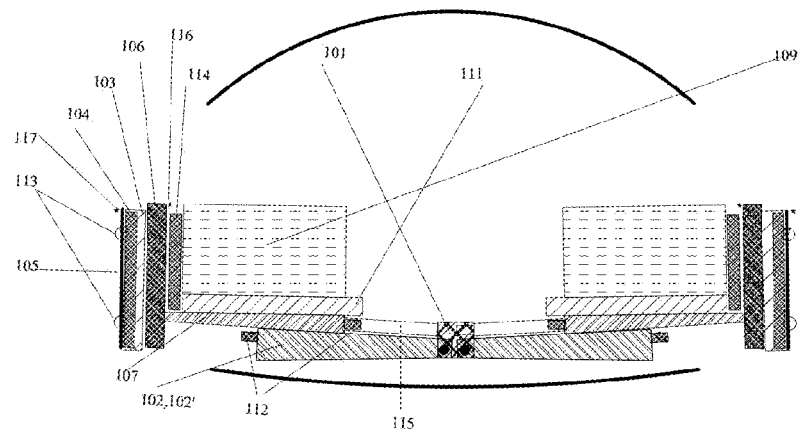
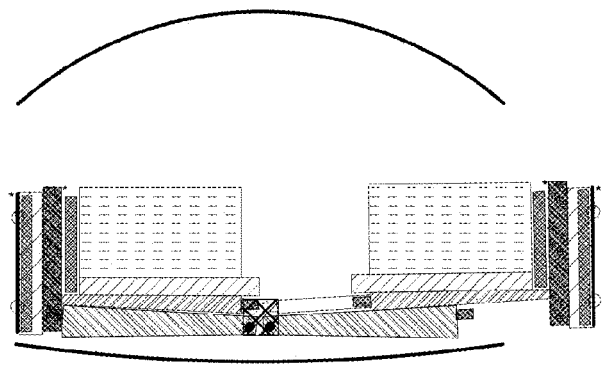

FIG 10 A1
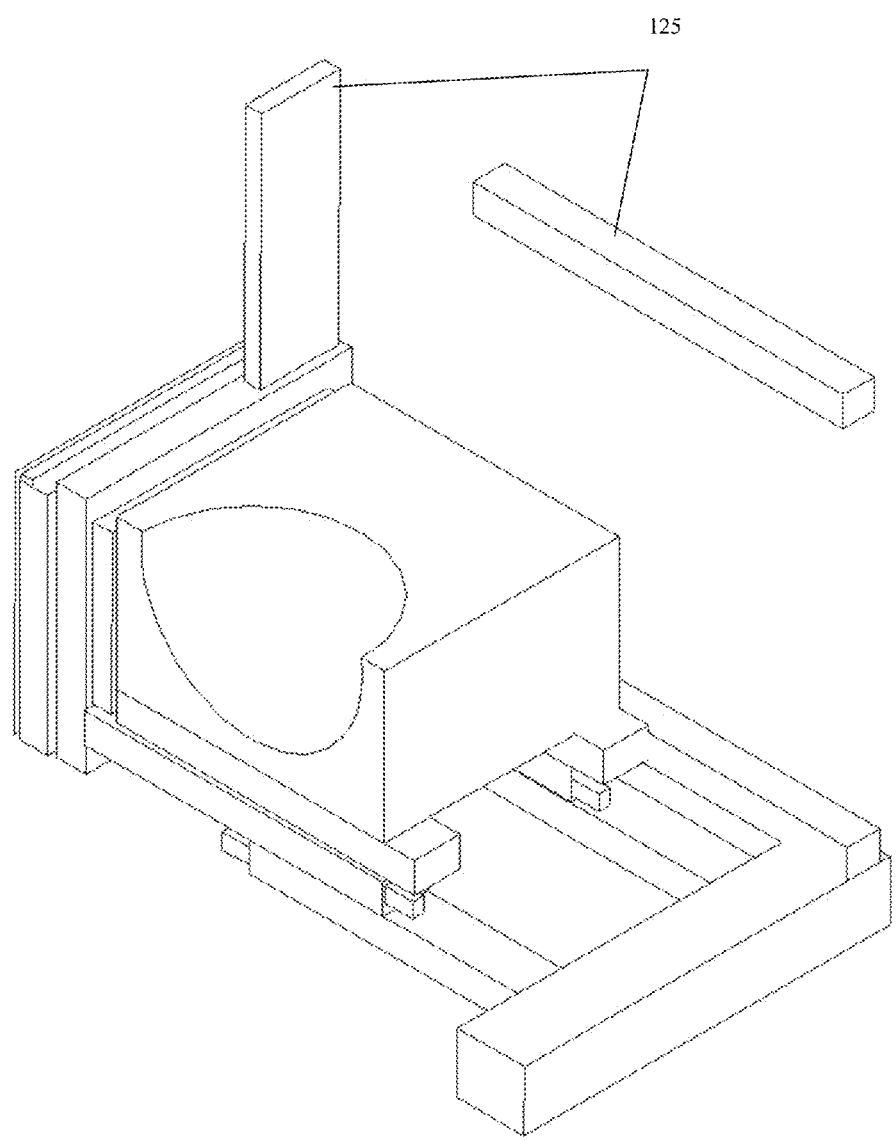

113

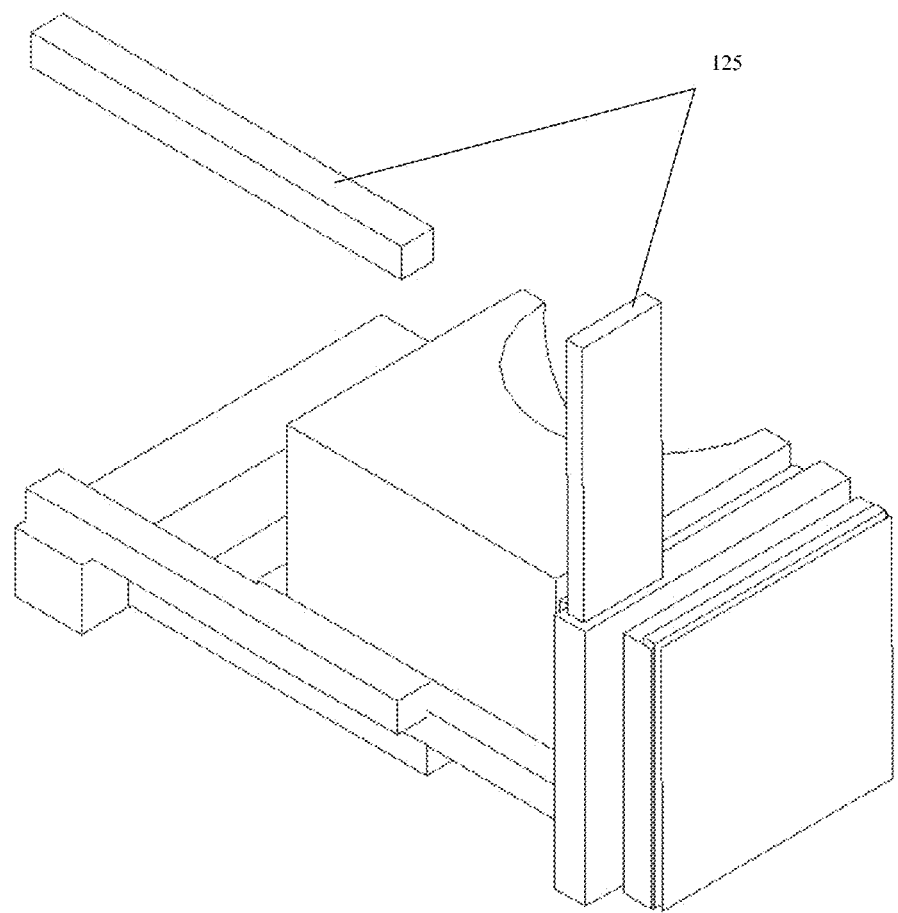
FIG 10 B1

FIG 11 Safety Zones

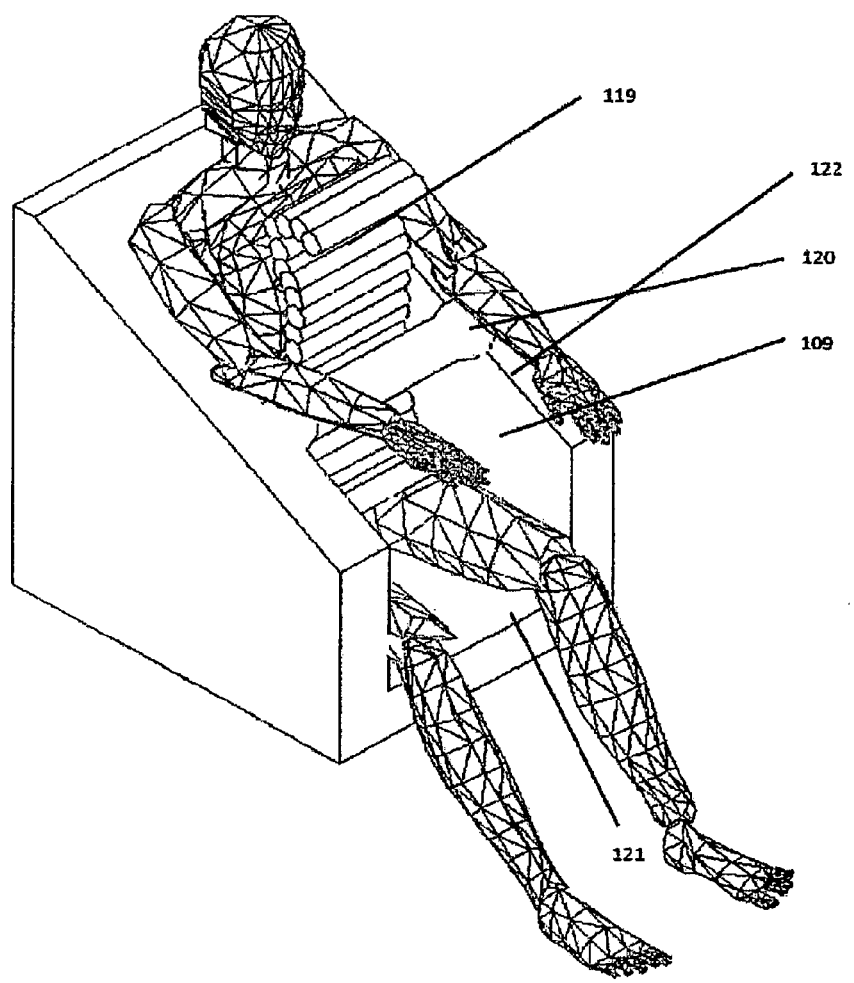
Fig 12 A1

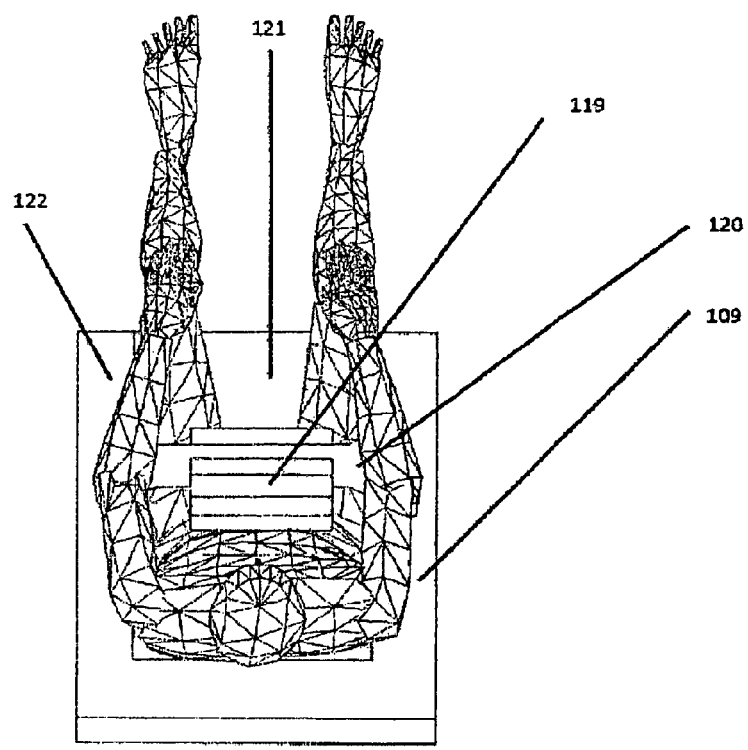
Fig 12B1

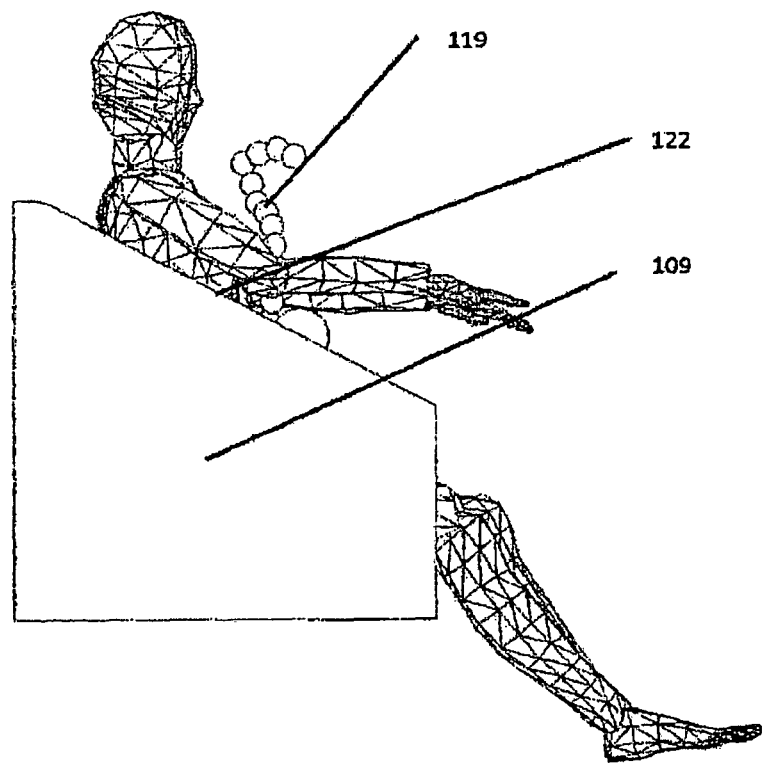
Fig 12 C1

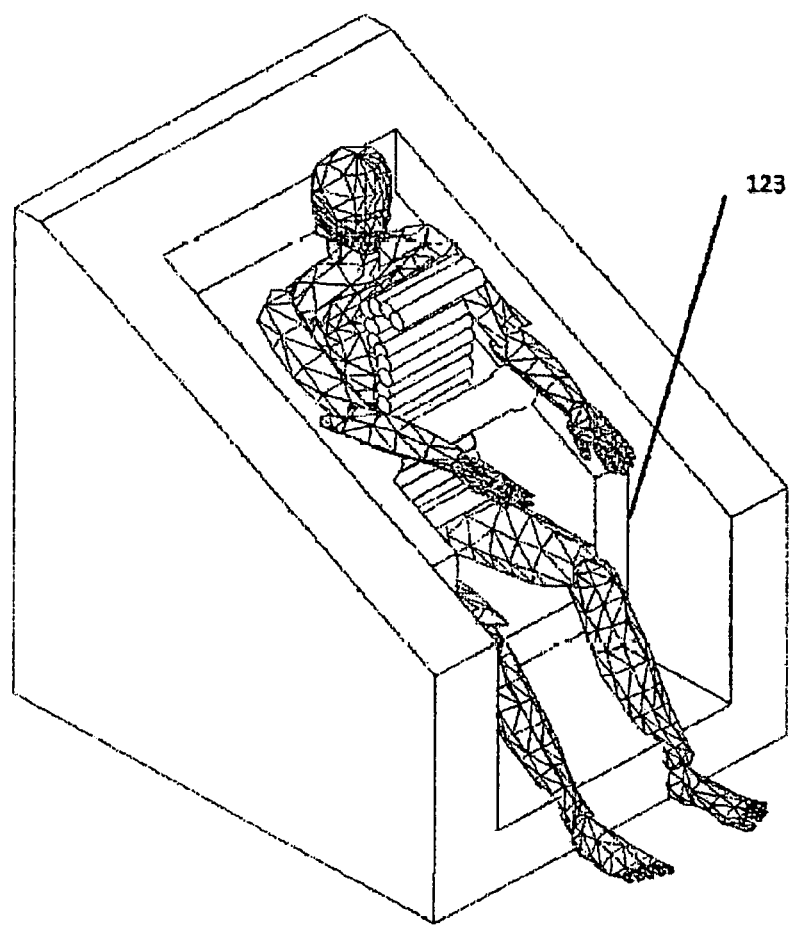
Fig 12 D1

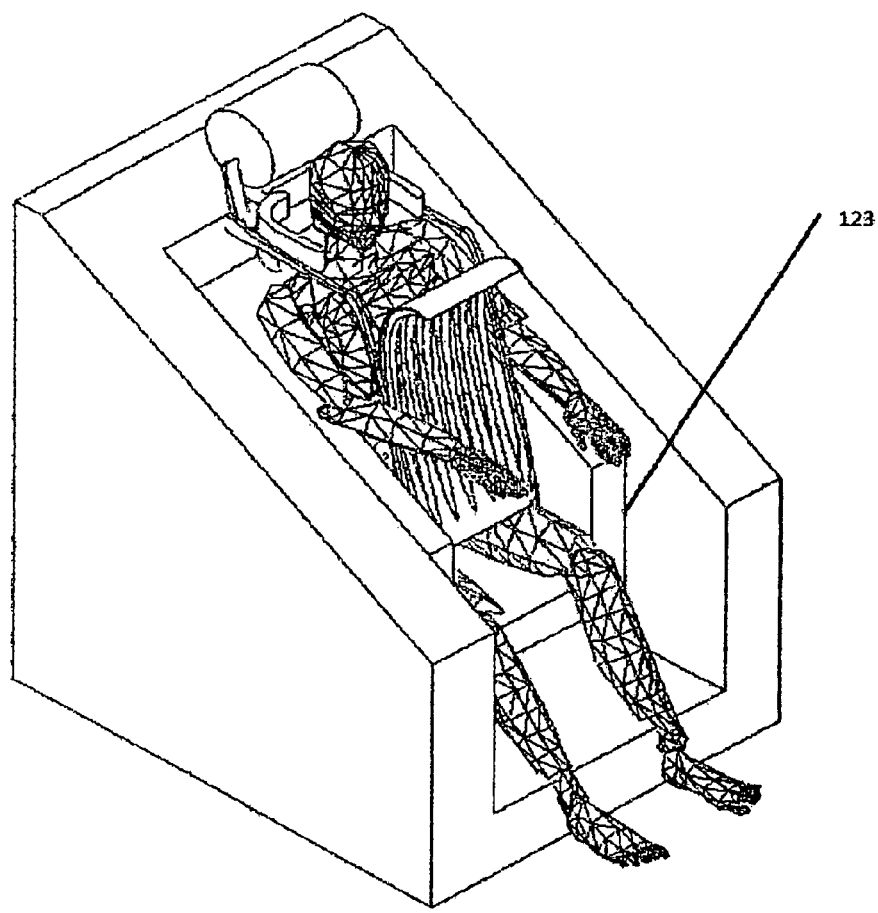
Fig 12 D2

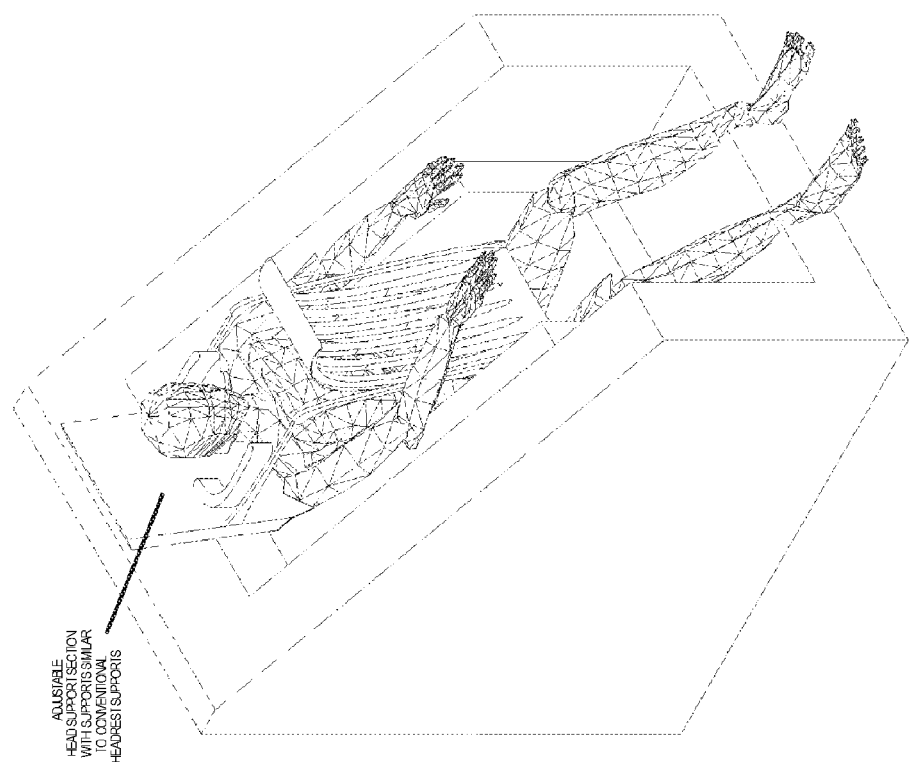

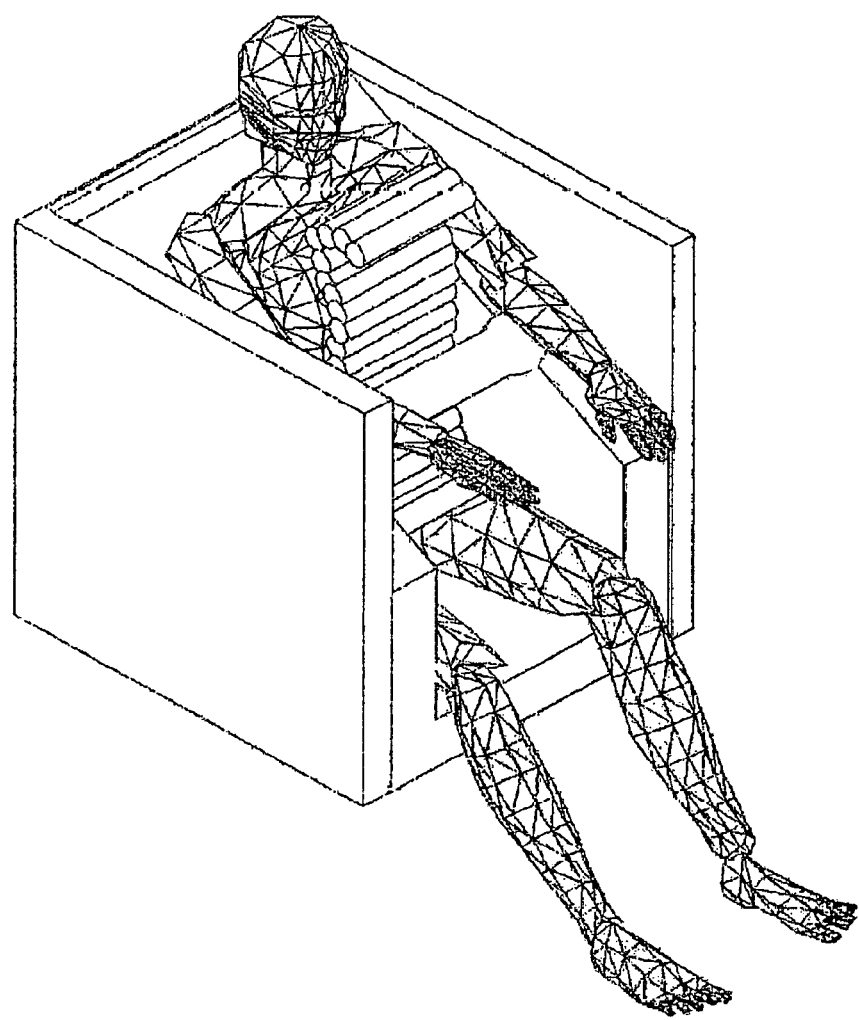
Fig 12 E1

Fig 12 F2
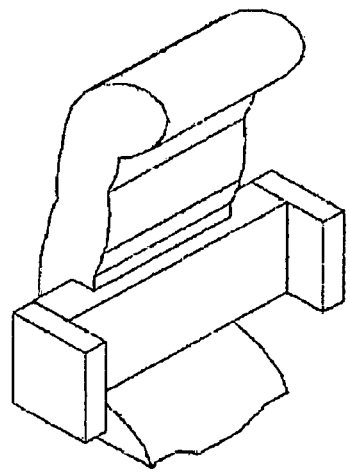
Fig 12 G2
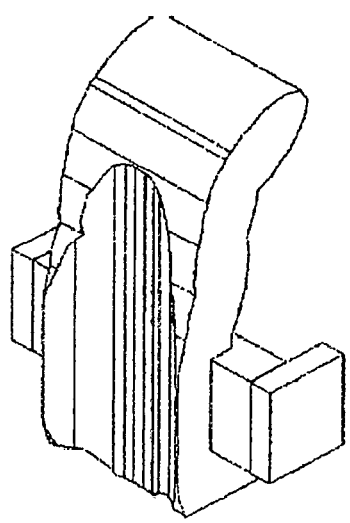

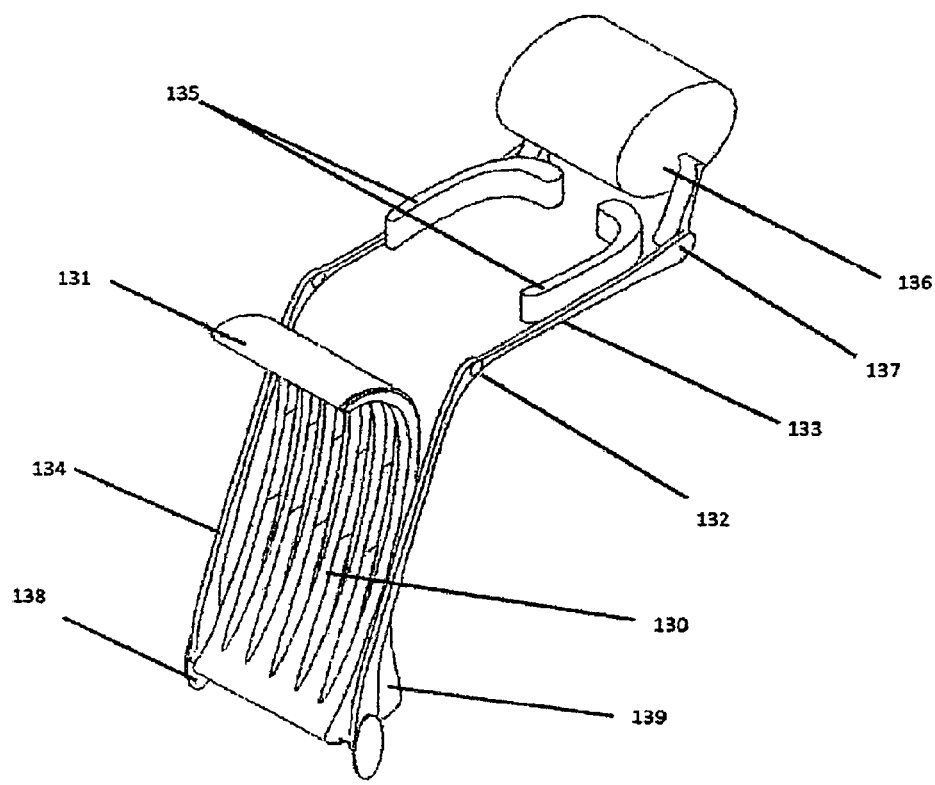
Fig 12 H2

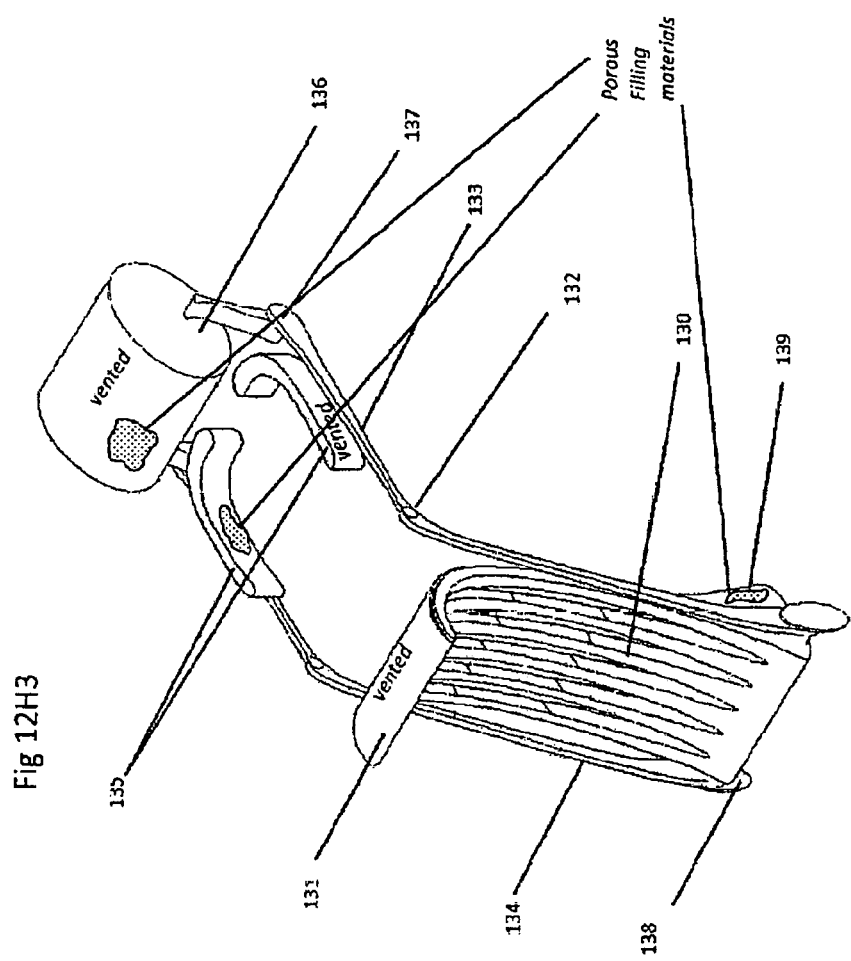

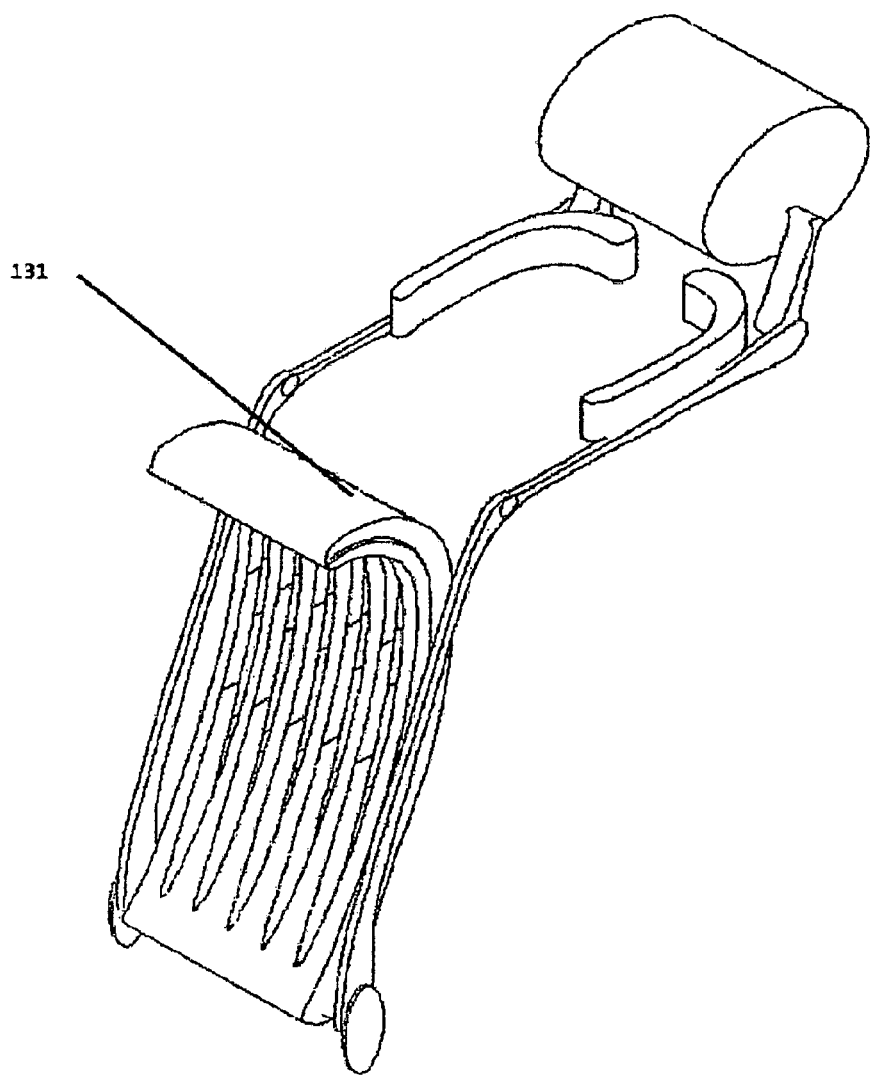

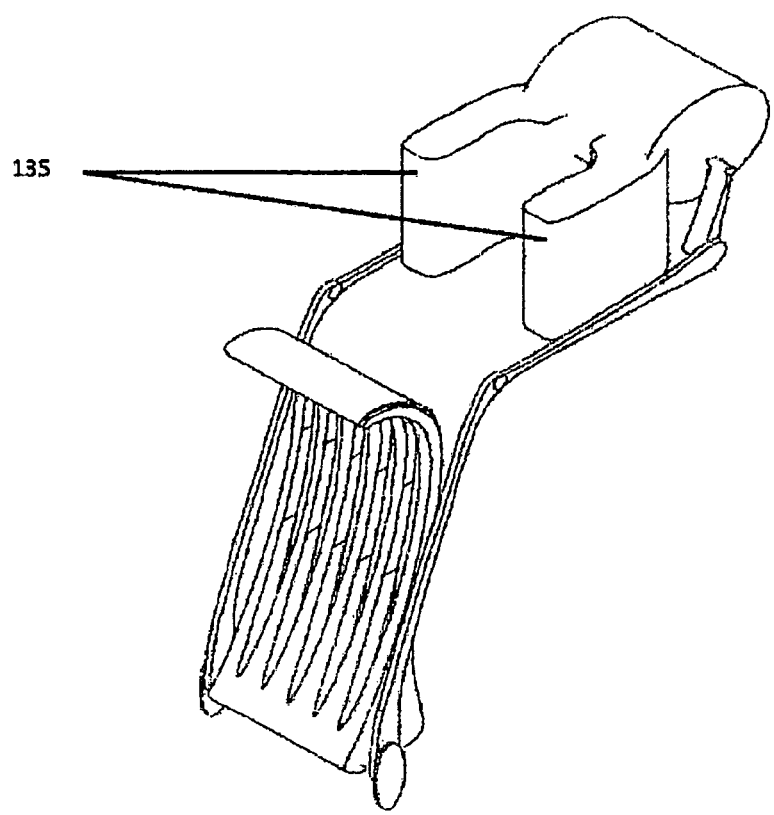

AN ISOMETRIC VIEW

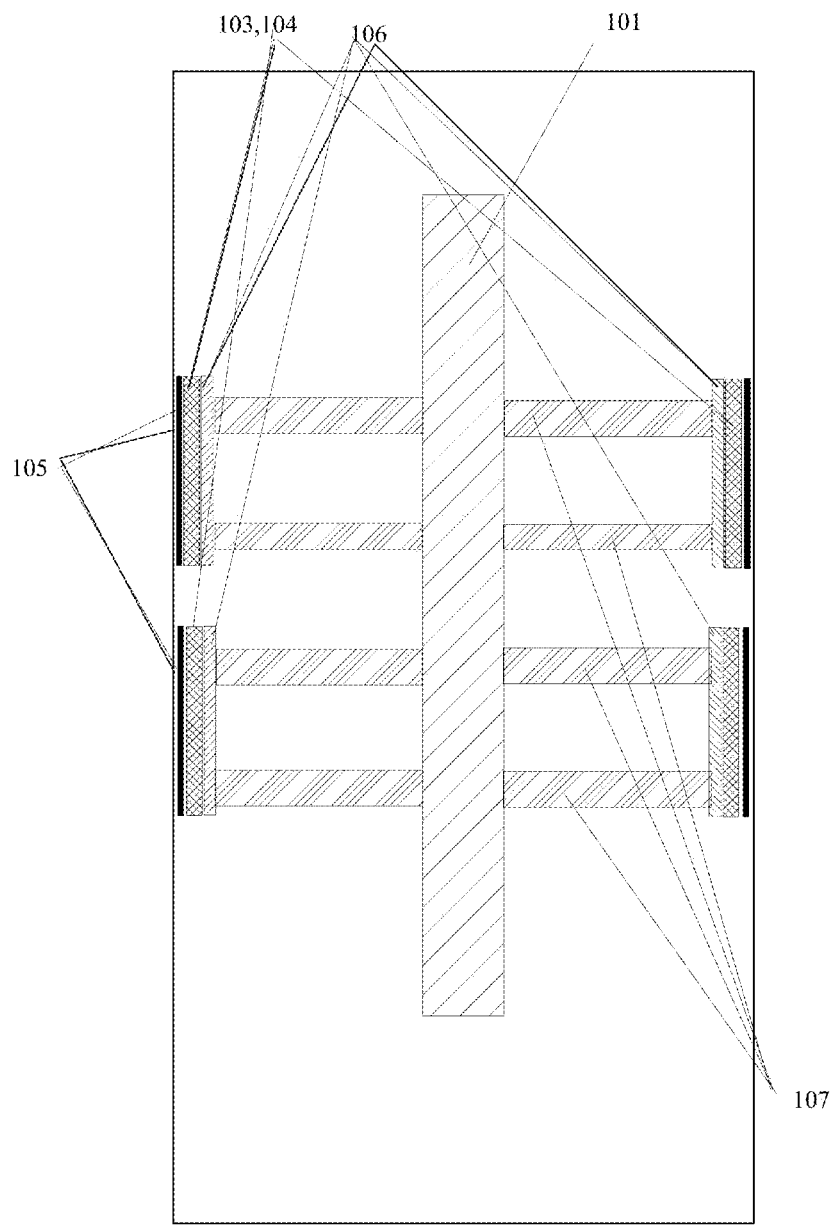

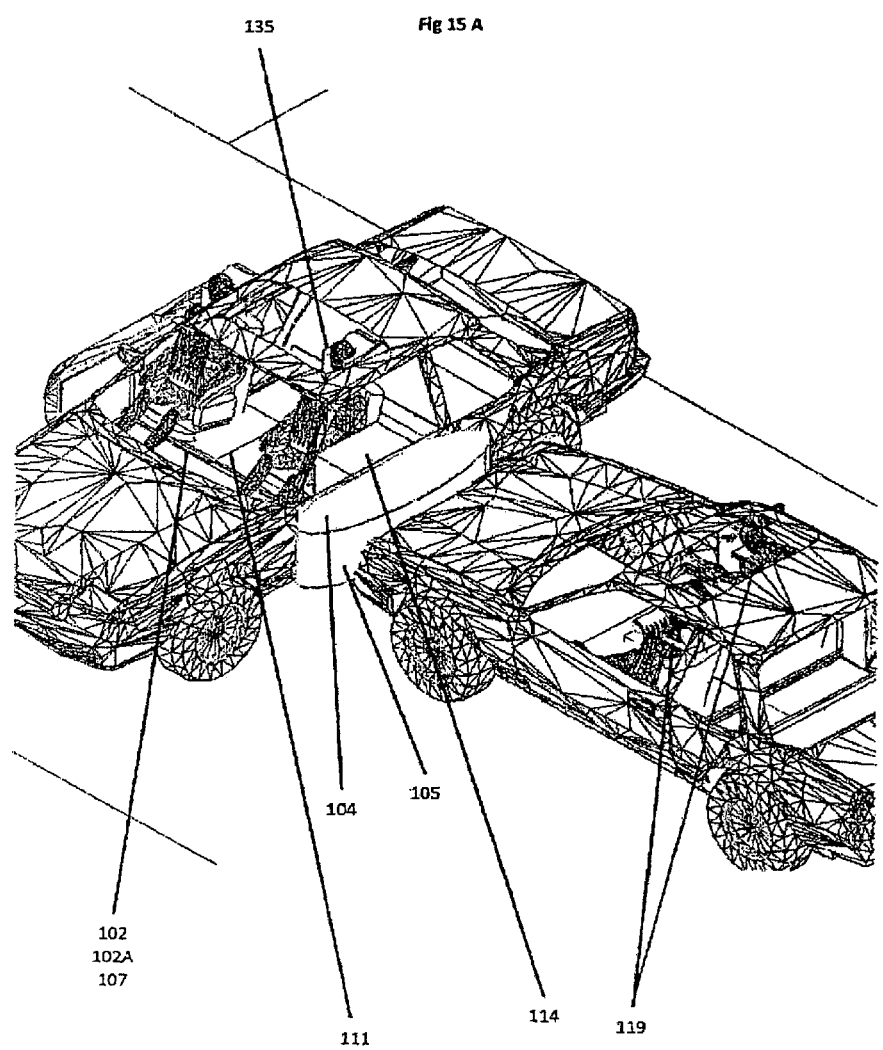

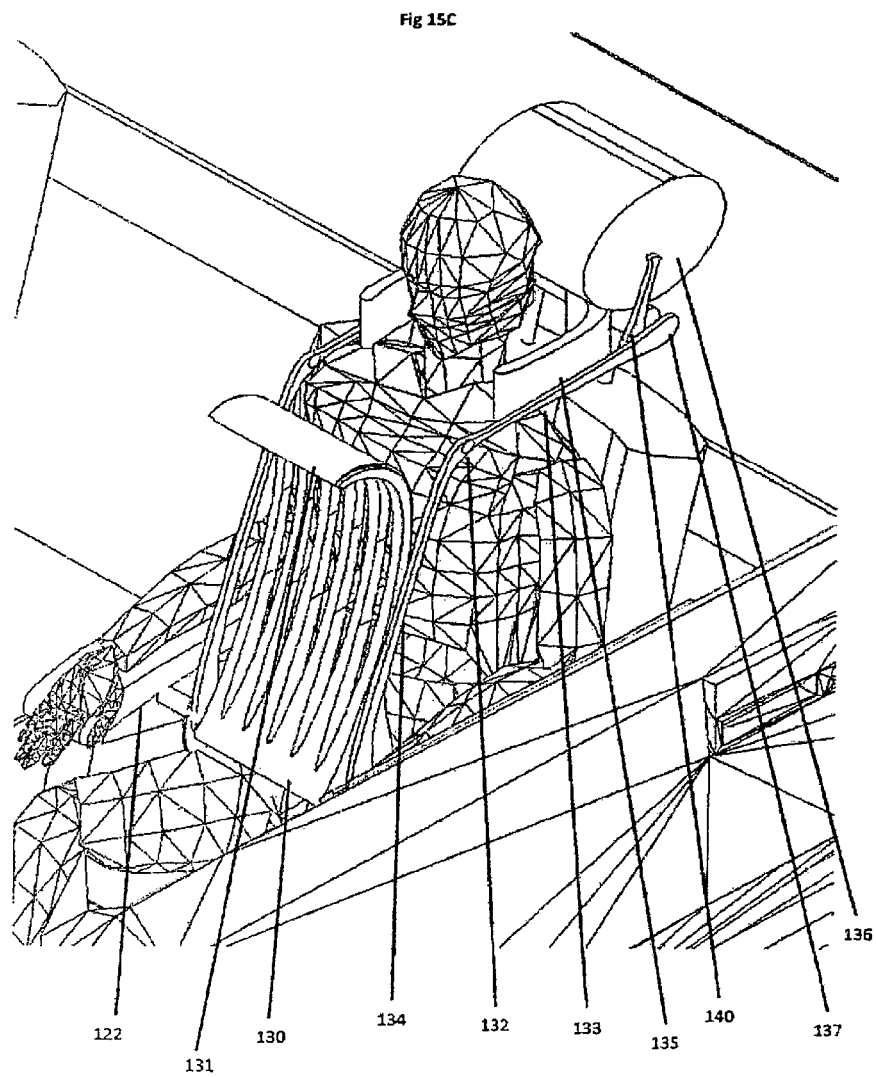

VEHICLE OCCUPANT SUPPORT

EACH OF THE FOLLOWING APPLICATIONS ARE HEREBY INCORPORATED HEREIN BY REFERENCE

This application is a continuation in part of: Ser. No. 13/138,183 filed Jan. 28, 2010 and Ser. No. 13/507,149 filed Jun. 9, 2012.

Both Ser. No. 13/138,183 filed Jan. 28, 2010 and Ser. No. 13/507,149 filed Jun. 9, 2012 are continuations in part of Ser. No. 11/185,784 filed Jul. 21, 2005 now U.S. Pat. No. 8,020,658 issued Sep. 20, 2011.

Ser. No. 13/507,149 filed Jun. 9, 2012 is also a continuation in part of Ser. No. 11/639,088 filed Dec. 14, 2006 now U.S. Pat. No. 8,251,444 Issued Aug. 28, 2012, claims priority to: Prov. Ser. Nos. 60/751,305 filed Dec. 17, 2006, 60/928,040 filed May 7, 2007, 60/848,804 filed Sep. 29, 2006 and 60/849,658 filed Oct. 5, 2006.

Ser. No. 13/507,149 filed Jun. 9, 2012 is also a continuation in part of Ser. No. 11/113,028 filed Apr. 25, 2005 now U.S. Pat. No. 8,138,908 Issued Mar. 20, 2012.

Ser. No. 11/185,784 filed Jul. 21, 2005 now U.S. Pat. No. 8,020,658 issued Sep. 20, 2011 is a continuation of: Ser. No. 10/681,304 filed Oct. 9, 2003 now U.S. Pat. No. 7,175,221; Ser. No. 09/779,594 filed Feb. 9, 2001 now U.S. Pat. No. 7,255,389; and Ser. No. 10/109,674 filed Apr. 1, 2002 now U.S. Pat. No. 7,159,923. U.S. Pat. No. 8,020,658 also claims priority to: EP Application No. 00203896 filed Nov. 7, 2000 now EP Patent No. 1099607; and EP Application No. 98948260 filed Sep. 17, 1998 now EP Patent No. 1021320.

U.S. Pat. No. 7,175,221 is a divisional of: Ser. No. 09/779,592 filed Feb. 9, 2001 now U.S. Pat. No. 6,742,833. U.S. Pat. No. 7,175,221 is also a continuation-in-part of: Ser. No. 10/279,171 filed Oct. 24, 2002 now U.S. Pat. No. 7,156,416. U.S. Pat. No. 7,175,221 also claims priority to: Ser. No. 09/779,594 filed Feb. 9, 2001 now U.S. Pat. No. 7,255,389; and Ser. No. 09/779,593 filed Feb. 9, 2001 now U.S. Pat. No. 6,715,816. U.S. Pat. No. 7,175,221 also claims priority to: EP Application No. 00203896 filed Nov. 7, 2000 now EP Patent No. 1099607; and EP Application No. 98948260 filed Sep. 17, 1998 now EP Patent No. 1021320. U.S. Pat. No. 7,175,221 also claims priority to: Prov. Serial Nos. 60,195,298 filed Apr. 10, 2000; 60/226,570 filed Aug. 21, 2000; 60/280,470 filed Apr. 2, 2001; 60/282,105 filed Apr. 9, 2001; 60/286,629 filed Apr. 26, 2001; 60/332,419 filed Nov. 14, 2001; 60/338,466 filed Dec. 3, 2001; 60/367,644 filed Feb. 20, 2002; 60/362,450 filed Mar. 8, 2002; and 60/461,434 filed Apr. 10, 2003.

U.S. Pat. No. 7,255,389 is a continuation in-part of: Ser. No. 08/936,626 filed Sep. 24, 1997 now U.S. Pat. No. 6,059,354; Ser. No. 09/404,475 filed Sep. 24, 1999 now U.S. Pat. No. 6,547,315; and Ser. No. 09/435,830 filed Nov. 8, 1999 now U.S. Pat. No. 6,609,749. U.S. Pat. No. 7,255,389 also claims priority to: EP Application No. 00203896 filed Nov. 7, 2000 now EP Patent No. 1099607; and EP Application No. 98948260 filed Sep. 17, 1998 now EP Patent No. 1021320. U.S. Pat. No. 7,255,389 also claims priority to: Prov. Serial Nos. 60,195,298 filed Apr. 10, 2000; and 60/226,570 filed Aug. 21, 2000.

U.S. Pat. No. 7,159,923 is a continuation-in-part of: Ser. No. 09/779,591 filed Feb. 9, 2001 now U.S. Pat. No. 6,609,754; Ser. No. 09/779,592 filed Feb. 9, 2001 now U.S. Pat. No. 6,742,833; Ser. No. 09/779,594 filed Feb. 9, 2001 now U.S. Pat. No. 7,255,389; Ser. No. 09/435,830 filed Nov. 8, 1999 now U.S. Pat. No. 6,609,749; Ser. No. 09/404,475 filed Sep. 24, 1999 now U.S. Pat. No. 6,547,315; and Ser. No. 09/779,593 filed Feb. 9, 2001 now U.S. Pat. No. 6,715,816. U.S. Pat. No. 7,159,923 also claims priority to: EP Application No. 00203896 filed Nov. 7, 2000 now EP Patent No. 1099607; and EP Application No. 98948260 filed Sep. 17, 1998 now EP Patent No. 1021320. U.S. Pat. No. 7,159,923 also claims priority to: Prov. Serial Nos. 60,195,298 filed Apr. 10, 2000; 60/226,570 filed Aug. 21, 2000; 60/280,470 filed Apr. 2, 2001; 60/282,105 filed Apr. 9, 2001; 60/286,629 filed Apr. 26, 2001; 60/332,419 filed Nov. 14, 2001; 60/338,466 filed Dec. 3, 2001; 60/367,644 filed Feb. 20, 2002; and 60/362,450 filed Mar. 8, 2002.

EP Application No. 00203896 claims priority to: Ser. No. 09/435,830 filed Nov. 8, 1999 now U.S. Pat. No. 6,609,749; and Prov. Serial Nos. 60,195,298 filed Apr. 10, 2000 and 60/226,570 filed Aug. 21, 2000.

EP Application No. 98948260 claims priority to Ser. No. 08/936,626 filed Sep. 24, 1997 now U.S. Pat. No. 6,059,354.

U.S. Pat. No. 7,156,416 is a divisional of: Ser. No. 09/404,475 filed Sep. 24, 1999 now U.S. Pat. No. 6,547,315; and Ser. No. 09/435,830 filed Nov. 8, 1999 now U.S. Pat. No. 6,609,749. U.S. Pat. No. 7,156,416 also claims priority to: Ser. No. 08/936,626 filed Sep. 24, 1997 now U.S. Pat. No. 6,059,354; Ser. No. 09/779,594 filed Feb. 9, 2001 now U.S. Pat. No. 7,255,389; and Ser. No. 10/109,674 filed Apr. 1, 2002 now U.S. Pat. No. 7,159,923.

U.S. Pat. No. 6,547,315 is a continuation of Ser. No. 08/936,626 filed Sep. 24, 1997 now U.S. Pat. No. 6,059,354.

U.S. Pat. No. 6,609,749 is a continuation-in-part of Ser. No. 08/936,626 filed Sep. 24, 1997 now U.S. Pat. No. 6,059,354.

U.S. Pat. No. 6,609,754 is a continuation-in-part of: Ser. No. 09/404,475 filed Sep. 24, 1999 now U.S. Pat. No. 6,547,315; Ser. No. 09/435,830 filed Nov. 8, 1999 now U.S. Pat. No. 6,609,749; and Ser. No. 08/936,626 filed Sep. 24, 1997 now U.S. Pat. No. 6,059,354. U.S. Pat. No. 6,609,754 also claims priority to: Prov. Serial Nos. 60,195,298 filed Apr. 10, 2000 and 60/226,570 filed Aug. 21, 2000. U.S. Pat. No. 6,609,754 also claims priority to: EP Application No. 00203896 filed Nov. 7, 2000 now EP Patent No. 1099607; and EP Application No. 98948260 filed Sep. 17, 1998 now EP Patent No. 1021320.

U.S. Pat. No. 6,742,833 is a continuation-in-part of: Ser. No. 09/404,475 filed Sep. 24, 1999 now U.S. Pat. No. 6,547,315; Ser. No. 09/435,830 filed Nov. 8, 1999 now U.S. Pat. No. 6,609,749; and Ser. No. 08/936,626 filed Sep. 24, 1997 now U.S. Pat. No. 6,059,354. U.S. Pat. No. 6,742,833 also claims priority to: Prov. Serial Nos. 60,195,298 filed Apr. 10, 2000 and 60/226,570 filed Aug. 21, 2000. U.S. Pat. No. 6,742,833 also claims priority to: EP Application No. 00203896 filed Nov. 7, 2000 now EP Patent No. 1099607; and EP Application No. 98948260 filed Sep. 17, 1998 now EP Patent No. 1021320.

U.S. Pat. No. 6,715,816 is a continuation-in-part of: Ser. No. 09/404,475 filed Sep. 24, 1999 now U.S. Pat. No. 6,547,315; Ser. No. 09/435,830 filed Nov. 8, 1999 now U.S. Pat. No. 6,609,749; and Ser. No. 08/936,626 filed Sep. 24, 1997 now U.S. Pat. No. 6,059,354. U.S. Pat. No. 6,715,816 also claims priority to: Prov. Serial Nos. 60,195,298 filed Apr. 10, 2000 and 60/226,570 filed Aug. 21, 2000. U.S. Pat. No. 6,715,816 also claims priority to: EP Application No. 00203896 filed Nov. 7, 2000 now EP Patent No. 1099607; and EP Application No. 98948260 filed Sep. 17, 1998 now EP Patent No. 1021320.

Ser. No. 11/113,028 filed Apr. 25, 2005 now U.S. Pat. No. 8,138,908 Issued Mar. 20, 2012 is a continuation-in-part of: Ser. No. 09/779,594 filed Feb. 9, 2001 now U.S. Pat. No. 7,255,389; and Ser. No. 10/109,674 filed Apr. 1, 2002 now U.S. Pat. No. 7,159,923. This application also claims priority to: EP Application No. 00203896 filed Nov. 7, 2000 now EP Patent No. 1099607; and EP Application No. 98948260 filed Sep. 17, 1998 now EP Patent No. 1021320.

U.S. Pat. No. 7,255,389 is a continuation in-part of: Ser. No. 08/936,626 filed Sep. 24, 1997 now U.S. Pat. No. 6,059,354; Ser. No. 09/404,475 filed Sep. 24, 1999 now U.S. Pat. No. 6,547,315; and Ser. No. 09/435,830 filed Nov. 8, 1999 now U.S. Pat. No. 6,609,749. U.S. Pat. No. 7,255,389 also claims priority to: EP Application No. 00203896 filed Nov. 7, 2000 now EP Patent No. 1099607; and EP Application No. 98948260 filed Sep. 17, 1998 now EP Patent No. 1021320. U.S. Pat. No. 7,255,389 also claims priority to: Prov. Ser. Nos. 60,195,298 filed Apr. 10, 2000; and 60/226,570 filed Aug. 21, 2000.

U.S. Pat. No. 7,159,923 is a continuation-in-part of: Ser. No. 09/779,591 filed Feb. 9, 2001 now U.S. Pat. No. 6,609,754; Ser. No. 09/779,592 filed Feb. 9, 2001 now U.S. Pat. No. 6,742,833; Ser. No. 09/779,594 filed Feb. 9, 2001 now U.S. Pat. No. 7,255,389; Ser. No. 09/435,830 filed Nov. 8, 1999 now U.S. Pat. No. 6,609,749; Ser. No. 09/404,475 filed Sep. 24, 1999 now U.S. Pat. No. 6,547,315; and Ser. No. 09/779,593 filed Feb. 9, 2001 now U.S. Pat. No. 6,715,816. U.S. Pat. No. 7,159,923 also claims priority to: EP Application No. 00203896 filed Nov. 7, 2000 now EP Patent No. 1099607; and EP Application No. 98948260 filed Sep. 17, 1998 now EP Patent No. 1021320. U.S. Pat. No. 7,159,923 also claims priority to: Prov. Serial Nos. 60,195,298 filed Apr. 10, 2000; 60/226,570 filed Aug. 21, 2000; 60/280,470 filed Apr. 2, 2001; 60/282,105 filed Apr. 9, 2001; 60/286,629 filed Apr. 26, 2001; 60/332,419 filed Nov. 14, 2001; 60/338,466 filed Dec. 3, 2001; 60/367,644 filed Feb. 20, 2002; and 60/362,450 filed Mar. 8, 2002.

EP Application No. 00203896 claims priority to: Ser. No. 09/435,830 filed Nov. 8, 1999 now U.S. Pat. No. 6,609,749; and Prov. Serial Nos. 60,195,298 filed Apr. 10, 2000 and 60/226,570 filed Aug. 21, 2000.

EP Application No. 98948260 claims priority to Ser. No. 08/936,626 filed Sep. 24, 1997 now U.S. Pat. No. 6,059,354.

U.S. Pat. No. 6,547,315 is a continuation of Ser. No. 08/936,626 filed Sep. 24, 1997 now U.S. Pat. No. 6,059,354.

U.S. Pat. No. 6,609,749 is a continuation-in-part of Ser. No. 08/936,626 filed Sep. 24, 1997 now U.S. Pat. No. 6,059,354.

U.S. Pat. No. 6,609,754 is a continuation-in-part of: Ser. No. 09/404,475 filed Sep. 24, 1999 now U.S. Pat. No. 6,547,315; Ser. No. 09/435,830 filed Nov. 8, 1999 now U.S. Pat. No. 6,609,749; and Ser. No. 08/936,626 filed Sep. 24, 1997 now U.S. Pat. No. 6,059,354. U.S. Pat. No. 6,609,754 also claims priority to: Prov. Serial Nos. 60,195,298 filed Apr. 10, 2000 and 60/226,570 filed Aug. 21, 2000. U.S. Pat. No. 6,609,754 also claims priority to: EP Application No. 00203896 filed Nov. 7, 2000 now EP Patent No. 1099607; and EP Application No. 98948260 filed Sep. 17, 1998 now EP Patent No. 1021320.

U.S. Pat. No. 6,742,833 is a continuation-in-part of: Ser. No. 09/404,475 filed Sep. 24, 1999 now U.S. Pat. No. 6,547,315; Ser. No. 09/435,830 filed Nov. 8, 1999 now U.S. Pat. No. 6,609,749; and Ser. No. 08/936,626 filed Sep. 24, 1997 now U.S. Pat. No. 6,059,354. U.S. Pat. No. 6,742,833 also claims priority to: Prov. Serial Nos. 60,195,298 filed Apr. 10, 2000 and 60/226,570 filed Aug. 21, 2000. U.S. Pat. No. 6,742,833 also claims priority to: EP Application No. 00203896 filed Nov. 7, 2000 now EP Patent No. 1099607; and EP Application No. 98948260 filed Sep. 17, 1998 now EP Patent No. 1021320.

U.S. Pat. No. 6,715,816 is a continuation-in-part of: Ser. No. 09/404,475 filed Sep. 24, 1999 now U.S. Pat. No. 6,547,315; Ser. No. 09/435,830 filed Nov. 8, 1999 now U.S. Pat. No. 6,609,749; and Ser. No. 08/936,626 filed Sep. 24, 1997 now U.S. Pat. No. 6,059,354. U.S. Pat. No. 6,715,816 also claims priority to: Prov. Serial Nos. 60,195,298 filed Apr. 10, 2000 and 60/226,570 filed Aug. 21, 2000. U.S. Pat. No. 6,715,816 also claims priority to: EP Application No. 00203896 filed Nov. 7, 2000 now EP Patent No. 1099607; and EP Application No. 98948260 filed Sep. 17, 1998 now EP Patent No. 1021320.

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

1. Field of Invention

The present invention defines a means to incorporate in passenger motor vehicles, unique safety arrangements particularly for lateral or side impacts that provide energy absorption by the mass of the vehicle but decouple the passenger from the impact acceleration and deceleration that is provided by the mass of the vehicle, thereby protecting the passengers during such collisions. Moreover, the same arrangement synergistically provides utility in access, comfort and further safety in the operating position for passengers and the driver.

2. Description of the Related Art

In the past safety of passengers was not always the priority in passenger vehicle design. In the evolution of motor vehicle design the structure moved from a chassis that held together the mechanical components of the vehicle—a structure that was then attached to a passenger compartment or to passenger seats. The design of the structure was to hold together the working components of the vehicle—a critical aspect at the time.

Thereafter in more recent times right up to the present, Exo-skeletal designs have been the dominant paradigm. Here rigid shells were constructed to hold both the mechanical components and the passengers in fixed positions. However such fixed shell structures have had limited success in protecting passengers and drivers when there are lateral collisions as passengers undergo the same impact related accelerations and decelerations as the remaining parts of the vehicle, as space limitations don't allow for "crumple zones" as in the case of impact protection for head on collisions. Passengers are particularly vulnerable to side impacts as they cannot take preemptive measures as with head-on collisions where there is speed control and directional control that is available. As vehicle speeds have increased substantially in the last several decades, these safety considerations for passengers have become critical and urgent. Vehicle designers—particularly automobile designers—have risen admirably to the task by incorporating myriads of devices and additions within the rigid shell paradigm to minimize risk in the event of collisions. Such devices include restraints such as seat belts and certain types of protective air bags. However, there are limits within the rigid shell paradigm for two reasons: First, the energy of impact cannot be easily diverted away from passengers into the remaining mass of the vehicle on impact. Second, the rigid shell needs to support high shear stresses on lateral impact and related compressive loads to the passenger compartment of the vehicle a factor that can only be addressed with greater mass of the vehicle that will impact its performance.

Another area of interest in passenger vehicles is to provide, in synergy with the above contributions, utility and comfort of passengers and drivers and further synergistic head-on collision protection.

There are four areas of Background art that are related to the present invention. These are: vehicles with sliding seats, safety arrangements addressing lateral impacts on passenger vehicles, air bags and other shock absorbing devices, and miscellaneous safety devices for frontal impacts. None of the inventions in these areas individually or collectively state or imply any aspects of the present invention. Moreover, none of this Background art even addresses the issue of energy transfer away from the passengers to the mass of the vehicle on impact and concurrently provide a mechanism for easy access to the vehicle with ejector seats. This is despite the urgent need in the car industry for such safety and utility. Moreover the novelty of the present invention is underscored as it provides solutions hitherto unidentified in a very large and competitive industry that is acutely aware of these needs and is constantly in search of new solutions to them.

Sloan U.S. Pat. No. 3,071,407 (1963) describes a single rear bench seat (lines 4-45)—full length (C1-L55), that can slide out of either side of the vehicle. It describes a door structure that may be attached to the seat and slide across and through the passenger compartment of the vehicle as the seat slides out. This invention does not state or imply any safety considerations in its structure, moreover such a bench seat on slides, in the event of a lateral collision on the doors will focus the impact energy on the passengers and these passengers will be the principal casualties as the mass of the vehicle slides away little harmed. This will be the case even in the embodiment described where the doors are fixed to the seat and slides through the passenger compartment with the seat. Moreover, it cannot be used in a front seat even for its limited functionality with doors fixed to the seat as driving instrumentation (steering wheel etc) will not allow a door to slide through the compartment. Finally it does not provide any comfort features for passengers over and above a bench seat. Mach U.S. Pat. No. 2,753,947 (1956) describes a sliding bench seat for the access of the engine of the vehicle it does not address the issue of safety of passengers or access utility. It is expected to perform similarly to Sloan in an impact on the doors or around the side profile of the passengers in the vehicle. Solomon U.S. Pat. No. 2,758,872 (1953) provides a sliding bench seat that goes through the doorway and for the same reasons as Sloan does not provide protection in side impacts or provide any comfort features over and above a bench seat. Cyphert U.S. Pat. No. 3,944,277 (1976) describes a seat mounted on a sliding platform that has a door at the end and protective walls around it. The arrangement being designed for the utility of the operator to reach points away from the body of the vehicle without dismounting the vehicle. This invention like Sloan does not state or imply any safety considerations in its use. Moreover there is no expressed or implied reference to the utility of mounting and dismounting the vehicle or for the comfort of the operator or the passengers except for the ability for the platform to move out to give the operator greater reach away from the vehicle body. Rees U.S. Pat. No. 5,213,300 (1993) describes internal design structure for slide arrangements that allow forward and backward movement of the passenger seats in vehicles. This like many other inventions prior to it relate to the structure of the slides to adjust the position of the seats for passenger comfort in the direction of motion of the vehicle.

All the above items of background art relate to sliding seats. None of the above background art related to sliding seats have stated or implied safety considerations. Moreover, none of them provide utility for mounting and dismounting a vehicle except for a bench seat that slides out on either side of the vehicle, or provide comfort features except for seating arrangement on a bench seat and in one of the above—the lateral movement for convenience of the operator.

Maier U.S. Pat. No. 2,148,950 (1939) provides a laterally braced passenger compartment that braces a rigid shell body of a vehicle. Barenyi U.S. Pat. No. 2,710,222 (1955) provides a stiffening for the bottom plate of a vehicle body. Catlin U.S. Pat. No. 5,660,428 (1997) provides a design for a rigid shell structure. Guertler U.S. Pat. No. 5,464,266 (1995) uses stiffening arrangements for the floor of the vehicle as a component of a rigid shell vehicle body. Masuda U.S. Pat. No. 5,671,968 (1968) describes a strengthened rigid shell for the passenger compartment Oliver U.S. Pat. No. 4,533,172 (1985) describes a three part rigid shell structure for motor vehicles with the central section for passengers Sinnhuber U.S. Pat. No. 5,000,509 (1991) describes an arrangement that transfers impact energy from lateral impacts to the rigid body of the vehicle but does so through rigid members that include elements in the seats. The seats have limited lateral movement and are not free to move independent of the vehicle body in the event of a collision, thereby placing the passengers on the direct path of the energy transfer Maeda U.S. Pat. No. 4,512,604 (1985) describes a lateral brace for the seat arrangement of the vehicle within a rigid vehicle body structure thereby distributing the impact energy to other parts of the rigid body structure. Sacco U.S. Pat. No. 5,435,618 (1995) describes a lateral stiffening element that braces the rigid vehicle body in the region of the seats. Bhalsod U.S. Pat. No. 5,716,094 (1998) describes a pusher block that engages the seat in the event of a lateral impact thereby providing a rigid member between the rigid body structure and the seats that can transfer impact energy to the seats.

All of the above items of background art related to bracing a rigid body structure and provide stiffening mechanisms within the rigid shell structure to distribute energy of lateral impact. None of these items of background art provide mechanisms to transfer energy away from passengers in lateral impacts, or provide other safety arrangements or provide utility for mounting and dismounting the vehicle or provide comfort features for passengers in the operating position.

Baber U.S. Pat. No. 5,725,265 (1998) presents airbags for front and rear vehicle bumpers that deploy on impact. Such devices cannot be implemented on the side of the vehicle as a deceleration zone is not available under operating conditions as may be made available in the front and back of the vehicle. Moreover, as this airbag deploys on impact it creates a deceleration zone by pushing its own vehicle away that may actually increase the impulse forces acting on the passengers. Mercier U.S. Pat. No. 3,822,076 (1974) describers similar external front and back airbags and uses probes that protrude from the vehicle at the front and back to deploy the airbags. Such apparatus cannot be installed on the sides of the vehicle, as clearances are small. Stirling U.S. Pat. No. 5,131,703 (1992) describes a fluid filled chamber around the vehicle that will provide a deceleration zone on impact—frontal rear or lateral. However this arrangement requires the deceleration zone to be present during normal operating conditions that will reduce the maneuverability of vehicles if deployed on the sides of the vehicle. Park U.S. Pat. No. 4,995,659 (1991) describes a gas filled chamber deployed around the vehicle. Such a chamber is normally inflated under normal conditions and reduces maneuverability of the vehicle. Campbell U.S. Pat. No. 4,815,777 (1989) describes a bumper that can be deployed selectively by filling with gas. This bumper is effective when extended only. It is not designed to be deployed when the vehicle is in motion, as it will reduce maneuverability. Hartmann U.S. Pat. No. 5,810,427 (1998) describes a mechanism that transfers fluid from one airbag to another on impact. The airbag that is deployed is normally in an extended position to absorb the impact energy and provide the deceleration zone. However, such an extended airbag will reduce the maneuverability of the vehicle. There is a literature ("Extended Bumper and Glass-Plastic glazing methods to reduce intrusion and ejection in severe motor vehicle crashes". C. C. Clark 1993. 26th Symposium on Automotive Technology and Automation. Aachen Germany., "Airbag bumpers inflated just before the crash" C. C. Clark., William A. Young. 1994. SAE Technical Paper 941051., "The crash anticipating extended airbag bumper system". C. C. Clark. 1994. Fourteenth International Technical Conference on the enhanced safety of vehicles. Munich Germany., "Airbags as a means to reduce crash loads and intrusion, and increase intervehicular compatibility." C. C. Clark. 1995. International Conference on Pelvic and Lower extremity injuries-Proceedings Washington D.C., Human Transportation Fatalities and Protection against Rear and Side Crash Loads by the Airstop Restraint" Carl Clark and Carl Blechschmidt. 1965. The Ninth Stapp Car Conference.) IDS, and background art on the construction of external airbags including deployment proactively with radar or other devices. This entire literature is limited to the use of proactive external airbags mounted on vehicles with rigid structures that include the passenger. There is no reference in this literature to the proactive detection of impact explicitly or implicitly creating a deceleration zone for passenger protection internally, relative to the vehicle as in the present invention. Moreover, this literature is focussed on external airbags for front impact protection with for example rigid penetration buffers to negotiate posts and trees, unlike the present invention which does not prescribe external airbags for front impacts. Furthermore, as this literature describes external airbags without perforation shields their implementability is questionable as, unlike internal airbags that are in relatively protected environments, impact with external airbags often occurs with objects with sharp points and edges that are likely to perforate the external airbags. The Present invention requires perforation shields for external airbags.

All the above items of background art relate to air bag devices for safety in vehicles. However, none of these references take the integrated approach of the present invention, as more fully explained below, which comprises proactive deployment of both internal and external air bags, together with sliding seat members and other devices. Moreover while the present invention can function even without the deployment of external airbags, either proactive or reactive, taken together these items provide protection for passengers which is more than the sum of the parts. Furthermore, none of the protection airbags disclosed, related to external air bags having protective perforation shields that further enhance their efficacy. Moreover none of these devices provide energy transferring mechanisms away from the passenger in a lateral impact or provide other safety features. Moreover they do not provide any utility features for passengers in mounting and dismounting the vehicle or provide comfort features to the passengers.

Perras U.S. Pat. No. 2,873,122 (1959) which describes an invention where upon a head-on collision the seat projects a curved protector around the passenger designed to protect the passenger. This curved protector retracts into the seat under normal operating conditions. It is not clear how effective such a mechanism will be as the acceleration of the passenger forward relative to the vehicle may precede that of curved protector's release from the seat. Satzinger U.S. Pat. No. 3,961,805 (1976) describes seat belts for frontal collisions that provide safety for vehicles. Such seat belts are in common use. However, they suffer from the drawback that they restrain the body of the passenger in the narrow regions covered by such belts which may cause injury as other parts of the body are not restrained. Moreover such belts are not popular, while in common use as the belts are in constant contact with the body—a factor that is not often relished. Pulling U.S. Pat. No. 3,981,520 (1976) describes an arrangement where that provides passenger movement and protection in frontal impacts. On impact the passenger moves in the vertical plane of motion to a more protected position while side firing airbags provide frontal protection. This system of deployment of airbags for frontal collision protection is similar to other frontal airbag systems. They are necessary as restraining systems during the collision but need to be retracted in conventional passenger compartments to give passengers access to their seats while mounting and dismounting the vehicle. Erickson U.S. Pat. No. 2,777,531 (1957) describes an invention that rotates the seat of the passenger thereby restraining and protecting the passenger on impact taking advantage of the inertia prior to impact to endow the passenger with rotational energy that changes the position of the seat. Such rotation can injure the passenger with impacts at present day passenger vehicle speeds.

All the above items of background art relate to frontal impact protection. None of these items provide a device that is normally deployed during operation, and provides a broad area of restraint across the body for the entire upper body, head and neck, without a need for changing the orientation of the passenger. Moreover none of these items provide any protection for side impacts or provide utility for mounting and dismounting the vehicle or for the comfort of the passengers in the operating position.

SUMMARY

In view of these prior references what would be useful is an arrangement that diverts the impact energy in lateral or side impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also a safety device for head-on collision protection that obviates the need for conventional seat belts and front impact airbags. Moreover, it would be useful to have a synergistic structural arrangement for the vehicle that targets strength of the vehicle to protect passengers while minimizing other massive elements in the vehicle.

The present invention includes these objects and advantages.

OBJECTS & ADVANTAGES

Some of the objects and advantages of the present invention are, to provide an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-a-vis the remaining mass of the vehicle. Furthermore the present invention differs sharply from the Background art in that the resulting structure synergistically permits the installation of contoured multi-element surround seats and a unique safety harness that protects passengers in head-on collisions, both of which may not be implementable without the slide or other moving arrangements for seats on either side of the vehicle in the present invention.

Another object and Advantage of the present invention is the gravity slide drive and a related shock absorbing arrangement relative to the fixed body members of the vehicle and the terrain traversed by the vehicle, for my arrangement for which there is no counterpart in the Background art. This allows further Utility and weight and energy saving in implementing the above elements of the present invention.

Another Object and Advantage of the present invention includes External side Airbags that differ sharply from the Background art in that for the first time they proactively create a "Just in Time" deceleration zone both for the passenger relative to the vehicle and also for the vehicle relative to the impacting body, for the lateral or side impact while not remaining in an extended position under normal operating conditions of the vehicle.

Another Object and advantage of this invention is a perforation resistant shield for external airbag protection that would reduce the probability of deployment failure. The background art does not provide for this function in externally deploying airbags.

Another object and advantage of the present invention is an indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

BRIEF DESCRIPTION OF DRAWINGS

FIG. 1 is an illustration of a front elevation of a seating arrangement in a passenger vehicle. This figure is an illustration of the invention in the normal vehicle operating condition. The impacting body is represented on the left as still distant but advancing towards the above passenger vehicle.

FIG. 2 is an illustration of the same vehicle arrangement as in FIG. 1, except that the impacting object has advanced towards the passenger vehicle adequately to trigger the distance and velocity sensors.

FIG. 3 is an illustration of the same vehicle as in FIGS. 1 and 2, except that the distance and velocity sensors have deployed the external Airbags. They may also provide delayed deployment of the internal Airbags.

FIG. 4 is an illustration of the same vehicle as in FIGS. 1, 2 and 3 except that the impacting object has made impact with deceleration and energy absorption provided by the External airbags and the shock absorbers and resisted by the mass of the vehicle through compression members as noted below. The Passengers and seats are free to move away from the impact on the secondary slides as the internal Airbag deploys, pushing out the Primary slide on the side away from the impact.

FIGS. 1B, 2B, 3B and 4B illustrate an alternative embodiment with a center console.

FIGS. 1F, 2F, 3F and 4F illustrate an alternative embodiment with a center console that is crushable (an element of "crushable elements") and as a result decreases the need for the ejection of the passenger on the further side of the vehicle at impact.

FIGS. 1G, 2G, 3G and 4G illustrate an alternative embodiment with center airbags (also an element of "crushable elements") that are a part of a passive airbag system to protect passengers during lateral impact by absorbing some of the impact energy but more importantly providing a means to inflate head and neck protection airbags and other anatomical micro cushions mounted in the vicinity of the human body. This particular embodiment has a crushable center console as well.

FIGS. 5 and 6 is an illustration of the seating arrangement as used for loading and unloading passengers and driver. FIG. 5 represents the open position and FIG. 6 represents the closed position.

FIGS. 5A and 6A illustrate an embodiment of the current invention with the protector shield/shock absorbers/external airbag hinging down to support the primary slide. A useful feature for larger vehicles with more than a single seat on each side.

FIGS. 7-9 is an illustration of the Gravity slide drive that may be embodied in the invention. FIG. 7 is an illustration of the Gravity Slide drive at the end of the unload cycle for passengers. FIG. 8 is an illustration of the Gravity slide drive at the beginning of the Load cycle for passengers. FIG. 9 is an illustration of the left side loaded and ready for operation of the vehicle and the right side at the start of the loading operation, emphasizing the independence of the two sides of the Gravity slide drive mechanism.

FIG. 10C is an illustration of a Plan view of the present invention for one side of the vehicle.

FIGS. 10A1, 10B1 are isometric views of an alternative embodiment with a vertical extension/"safety cage" to protect passengers further. FIG. 10C1 is a plan view of the same arrangement.

FIG. 12A is an illustration of an isometric view of the Seat arrangement. FIGS. 12B and 12C is an illustration of the Plan and Side Elevation of the seat arrangement. FIG. 12A1 illustrates an alternative embodiment of the seat arrangement. FIGS. 12B1 and 12C1 illustrate the plan and elevation of this embodiment. FIG. 12D1 illustrates an embodiment of the child seat with scaled harness of 12A1 in an embodiment of the adult seat. FIG. 12 D3 illustrates an embodiment of the child seat with conventional supports for the headrest. FIG. 12 D3A shows an adjustable headrest. FIG. 12E1 illustrates an embodiment with a different external profile for the seat providing greater protection to the passenger. FIGS. 12F2 and 12G2 illustrate isometric views of an embodiment of the safety harness and 12H2, 12I2, 12J2 illustrate an isometric view of another embodiment of the safety harness, in the normal state, with front impact anatomical passive micro aircushions deployed, and the head and neck anatomical micro air cushions deployed respectively. FIG. 12 H3 illustrates the venting and filling materials of an embodiment of the invention.

FIG. 14 illustrates a horizontal cross section of an embodiment of the present invention at the level of the upper primary slides.

LIST OF REFERENCE NUMBERS

Figure 1C:
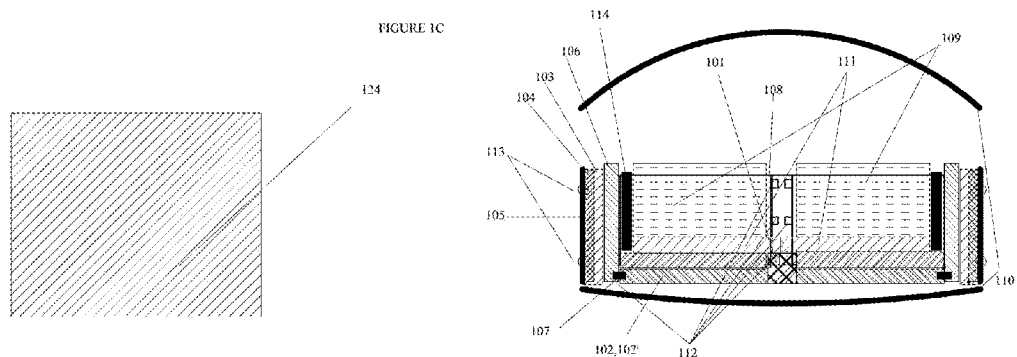
FIGS. 1C, 2C, 3C and 4C illustrate an alternative embodiment that has an auxiliary beam mounted behind the seat with a high section of the central member of the skeletal structure behind the seat to abut the auxiliary beam.

101—Central Member of Indo-skeletal structure 102—Safety Beam Lower Element/Lower Primary Slide 103—Side impact shock absorbers 104—External Air Bags 105—Perforation Shields 106—Protector Shields 107—Safety Beam Upper Element/Upper Primary Slide 108—Auxiliary Beam. (fixed or sliding) 109—Multi-element contoured passenger seat 110—Vehicle Shell/Body 111—Secondary Slides/Impact decouplers 112—Locking devices 112 A-Pivot for Protector shield 113—Proactive Velocity/Distance Detectors 114—Internal side impact airbag 115—Spring device for manual slide 116—Inside door open button 117—outside door open button 118—Beam pivot for Gravity slide drive ejector 119—Safety Harness 120—Support for Safety Harness 121—Bottom of seating surface of the contoured seat 122—Contoured arm rests 123—Child seat attachment 124—Impacting body 125—Vertical extensions/Safety Cage (fixed or sliding) 126—Center console 127—Secondary slide/Center console locks 128—Instrumentation 129—Center airbags-energy absorption/passive head and neck anatomical airbag system 130—Safety Harness Shield 131—Safety Harness—Anatomical passive micro air cushion and visco-elastic buffer 132—Safety Harness elbow 133—Safety Harness extending upper arm 134—Safety Harness Pivoting lower arm 135—Safety Harness Head and neck anatomical micro aircushions (active or passive) 136—Safety Harness Adjustable Head restraint 137—Safety Harness Hinged support 138—Safety Harness Locking Support 139—Safety Harness passive micro aircushion air reservoir 140—Adjustable Hinge support on seat 141—Foot rest 142—Sacrificial chamber 143—Micro air-cushion—displacement function 144—Micro air cushion—support function 145—Valves—air flow/fluid flow 146—protected entity 147—Fluid paths 501—Safety zone 502—lateral support element 503—reinforced seat side 504—left support adjustable multi-element 505—right support adjustable multi-element 506—back support adjustable multi-element 507—bottom support adjustable multi-element 510—Reinforcing—Safety beam upper element 511—Reinforcing—Safety Beam Lower Element 512—Anchor Bracing Bracket 513—Passenger Protection Detectors 514—Net Structure for Harness 515—Frame for Net Structure for Harness 516—Retractable Canopy

DETAILED DESCRIPTION OF INVENTION

The present invention provides a passenger vehicle a structure that synergistically incorporates two functions. First, during lateral or side impacts, a means to decouple from impact, and protect passengers while projecting the remaining mass of the vehicle to decelerate the impacting body, and second, utility to passengers and drivers, in mounting and dismounting the vehicle with the comfort of contoured surround seats. The arrangement may in some embodiments use an indo-skeletal beam that allows such embodiments to rely on compressive force transmission to transfer impact energy to the mass of the vehicle rather than shear loads that are required in the shell paradigm of construction in most current passenger vehicles.

The present invention may use Primary and Secondary slides on each side of the vehicle, to meet these objectives. The Primary slide has among other attached devices, a protector shield that bears the impact force in lateral or side impacts. Such protector shields may be hinged out for access if the sliding arrangement is not used. The Primary Slide may engage a central indo-skeletal beam in some embodiments. The Secondary slide is attached among other devices to possibly contoured surround seats (the passenger support mechanisms). This slide may be activated under impact to guide passengers in their seats away from the impact zone.

The present invention may utilize a Safety Beam in the vicinity of the seats. However, there is an important advance over the Background art in that the Beam does not lock the passengers on the path of the energy transfer, but rather, conducts the energy of impact away from the passenger to the indo-skeletal frame or to the body members of the shell (collectively elements of the fixed body members) and thereby to the mass of the vehicle (the massive components of the vehicle such as but not without limitation the motor and vehicle frame) allowing independent motion of the passengers away from the impact.

The present invention may use proactively fired external airbags which for the first time provide a means to create a "Just in Time" deceleration zone on the side of a vehicle prior to impact but not deployed under normal operating conditions of the vehicle. Notably, Background art for external airbags that are either extended under normal operating conditions of the vehicle or require reactive deployment cannot function effectively, as the former will impede the maneuverability of the vehicle and the latter will not be able to create a deceleration zone in time for the impact.

The following descriptions are for embodiments of the present invention. Deviations from this description in an embodiment is possible without deviating from the present invention.

Preferred Embodiment

Figure 1D:
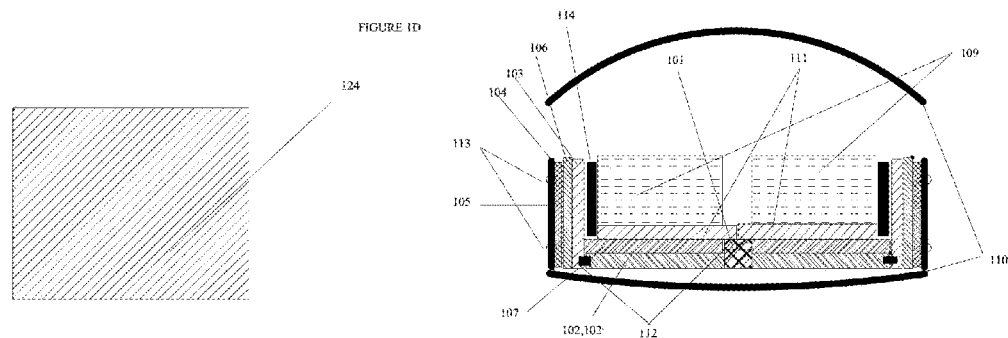
FIGS. 1D, 2D, 3D and 4D illustrate an alternative embodiment with the shock absorbers mounted internal to the protector shield.
Figure 11:
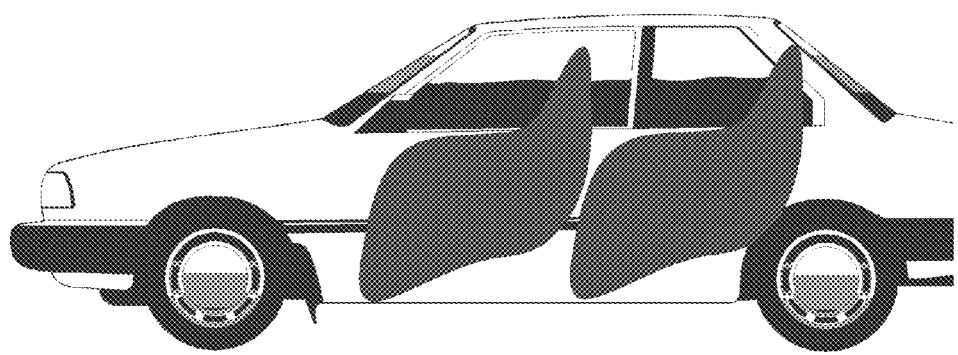
FIG. 11 is an illustration of the position of the "Safety Zones" that are targeted for protection with the Protector shields.

The following is a detailed description of some of the components of this embodiment. The seating arrangement of a passenger vehicle is shown in FIG. 1. The cross section of the central member of the indo-skeletal structure (101) is fixed to the safety beam lower element (102). The Protector Shield (106) is firmly attached to the Safety beam Upper element/Upper Primary slide (107), which slides on the Safety beam lower element/lower Primary slide (102). (The terms upper and lower bed used for the slides to distinguish them and not representing a relative elevation of the slides). The construction of such protector shields would follow that of any impact resisting body panel member of a vehicle, with the usual weight strength tradeoffs. Such construction is well disclosed in the background art. The sliding arrangement may use single element or multiple element direct contact low friction surfaces sliding on one another, roller bearings, ball bearing structures—all of which are well disclosed in the background art. The Protector Shields (106) are designed to cover the required "safety zone" (501) as noted on FIG. 11. The Safety beam upper element/upper Primary Slide (107) locks into the Central member of the indo-skeletal structure (101) in the operating position with locking devices (112). Such locking devices do not take any additional loads on impact, and may as a result follow the extensive background art for locking devices for example similar mechanisms to those used in automobile door locks. These locks may be activated by the ignition key switch for additional safety while the vehicle is operational. The Protector Shield (106) has attached on the outside a shock absorber (103), which may include external airbags (104). (the protector shield in this embodiment provides a protective skin on the side of the vehicle) The construction of such shock absorbers follow the background art. Such external airbag (104) are protected from sharp objects on impact by a Perforation Shield (105). These perforation shields protect the external airbag (and the passenger) from sharp objects. The construction of such perforation resisting shields are well disclosed in the background art. Such Perforation shields may be attached by conventional means to the outer surface of the airbag and retained in the normal operating position using techniques used for airbags both internal and external disclosed in the background art. The Air Bag (104) is deployed with distance and velocity sensors (113) mounted on the Perforation shields (105). Distance and velocity sensors are used in other applications and their construction is well disclosed in the background art. The Safety beam upper element/Upper Primary Slide (107), supports the secondary slide/Impact decouplers (111). In this embodiment this is firmly attached to the Safety Beam Upper element/upper Primary Slide until the impact when it is decoupled to slide away from the impact. The Secondary slide arrangement may use a friction based approach, or other approach, all of which are well disclosed in the background art. This embodiment has contoured surround Passenger Seats (109) that are mounted on the Secondary slides (111). These seats have internal Airbags (114) that deploy on impact and may "unfurl" upwards to protect the head or upper body as well. The construction of seat adjustment mechanisms are well disclosed in the background art. This Figure shows the impacting object on the left approaching the vehicle, but too distant to trigger any action.

Figure 2C:
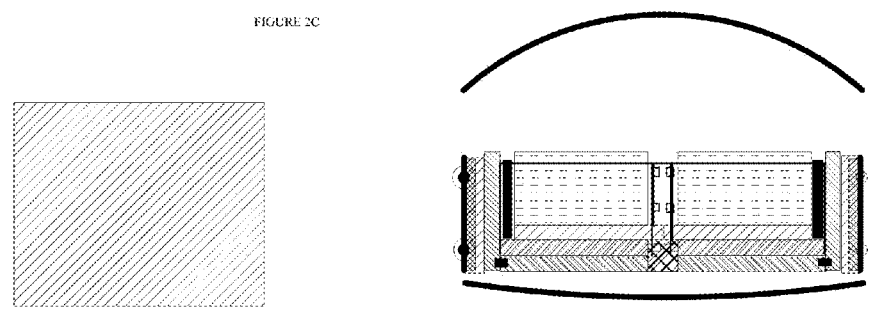
Figure 3C:
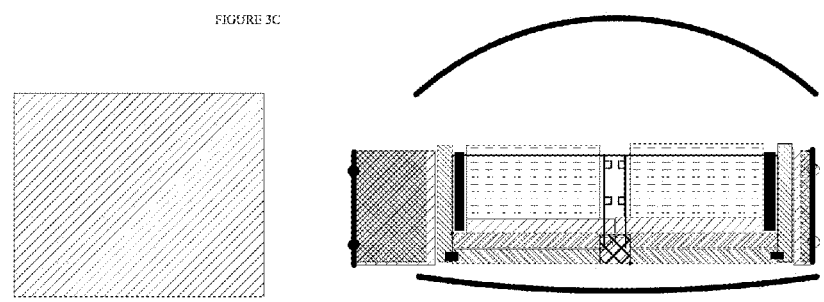
Figure 2D:
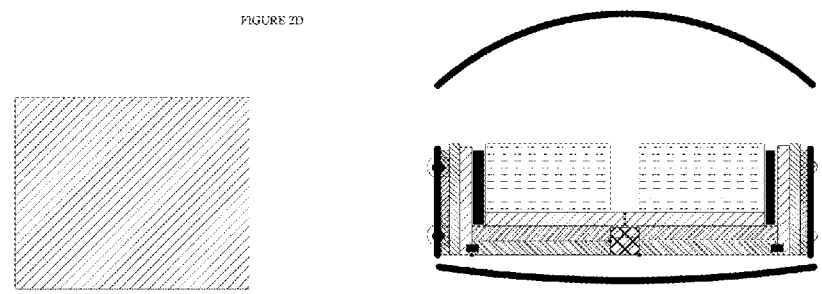
Figure 3D:
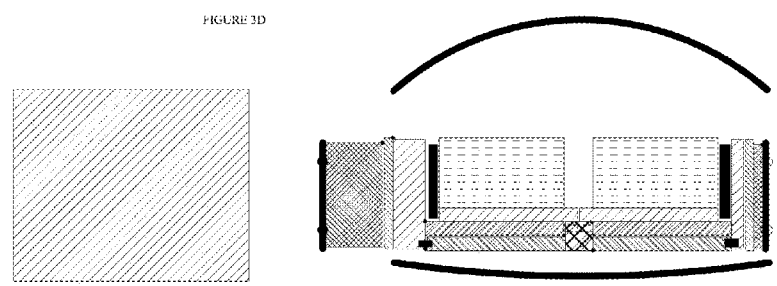
Figure 4D:
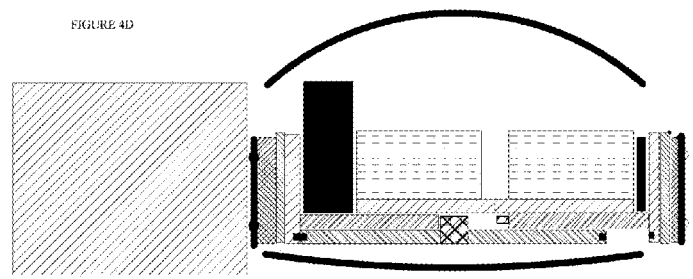
Figure 15:
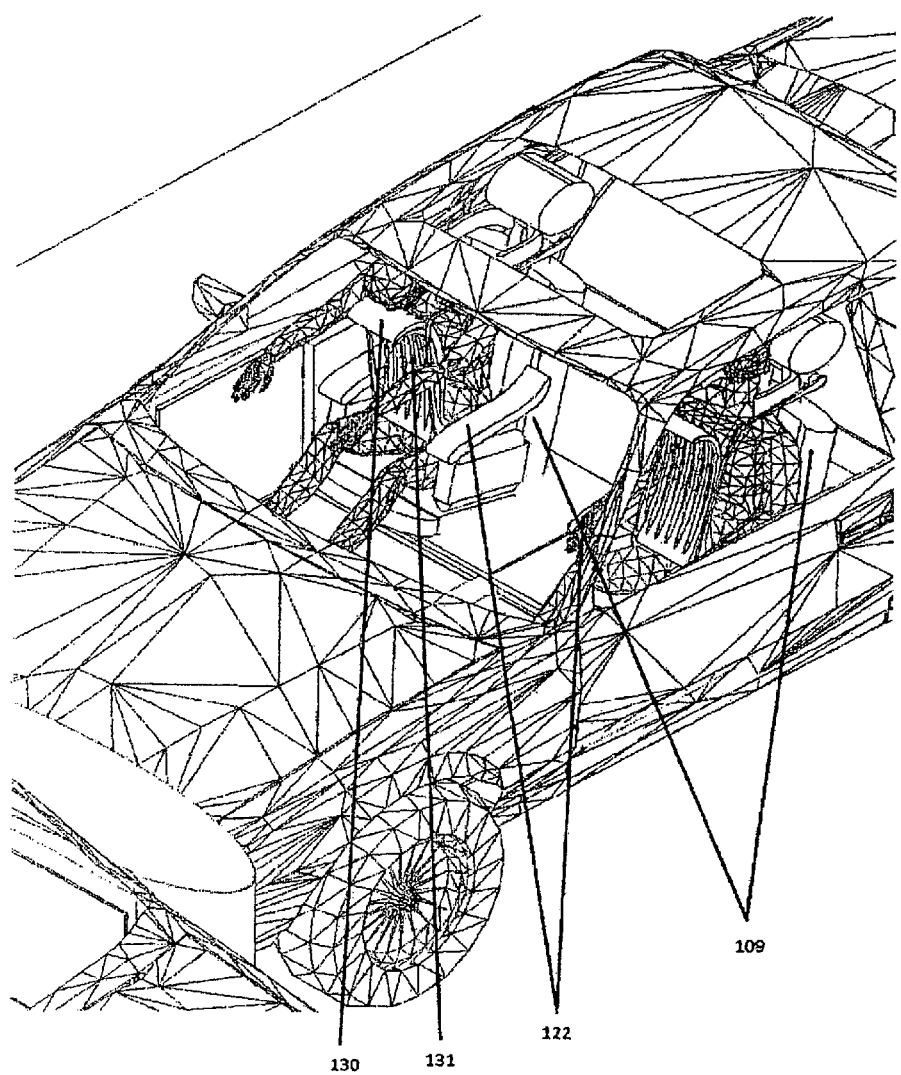
FIG. 15A illustrates a side impact with internal and external airbags deployed and the passengers ejected away from the impact.
FIG. 15B illustrates the deployment of the anatomical passive micro aircushions in a front impact and the passenger impact protection with the harness and shield. The left side passenger illustrates the normal position for reference.
FIG. 15C illustrates a detailed view of the safety harness and its components.

In FIG. 2, the impacting object has moved to a position that can now trigger the distance and velocity sensors (113). These sensors trigger the deployment of the External Airbags (104), and the shock absorbers (103). The internal airbags (114) may be triggered by conventional means disclosed in the prior art, explicitly or implicitly reacting to proactive or reactive impact detection. The internal air bags are designed to move the passengers and the passenger seats to the extent necessary through a Motion Space to a Safe Position on primary impact detection, and thereafter protect the protected entity—the passenger and the seat. Thereafter as illustrated in FIG. 3, the External Airbags (104) and shock absorbers (103) deploy to provide the required deceleration zone for the impact. As a result on impact the energy of impact is partially absorbed by the External Air bag (104) and the Shock Absorber (103) and the remaining energy transferred to the massive components of the vehicle through the Protector Shield (106), the Safety beam upper element/upper primary slide (107) and the safety beam lower element/lower primary slide (102) to the Central element of the Indo-skeletal frame (101) and the body of the vehicle. Notably, the Secondary slides (111) decouple and slide the passenger seats (109) with the passengers away outside the path of the impact forces and protected by the internal Airbag (114). The Safety beam upper element/ Upper Primary Slide (107) on the side of the vehicle away from the impact is free to slide out with all devices mounted on it to provide a path for the secondary slide (111) and the seats (109). In this situation it may be seen that the Safety beam upper element/upper primary slide works as an impact-resisting beam on the side of the impact and a release and support mechanism on the side away from the impact. FIG. 15A illustrates the side impact with the deployed internal and external airbags, and the displaced passengers away from the impact in the vehicle sustaining the lateral impact. FIG. 15B illustrates the frontal impact support for the passenger on the right hand side. The Left hand passenger is shown in the normal position for comparison.

FIG. 14 illustrates a horizontal cross section of the embodiment at the height of the safety beam upper element/ upper primary slides (107). The central member of the indo-skeletal structure (101) is flanked by the safety beam upper element/upper primary slides (107) abutting the central member, with the protector shields (106) and the shock absorbers that include the external airbags (103,104) at the outer end of the safety beam upper element/upper primary slides. The perforation shields are shown at the outer extreme of the shock absorbers and airbags. In this embodiment there are two sets of safety beam upper element/upper primary slides on each side of the vehicle that can support two rows of seats (front and rear) one on each side with its own protection with the protection shields and shock absorbing devices.

Figure 10A:
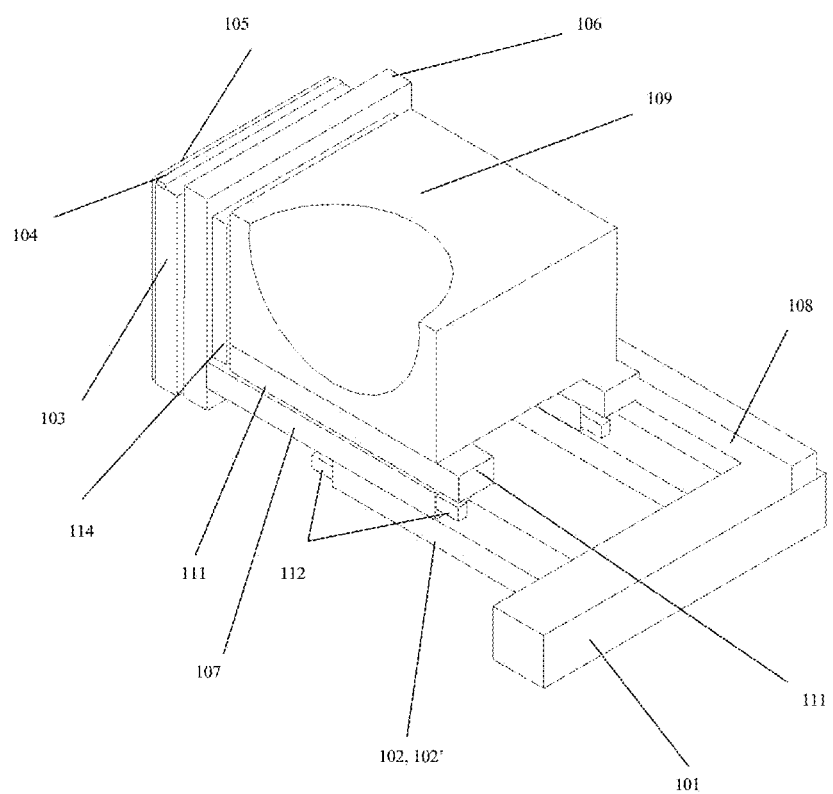
FIGS. 10A and B are an illustration of Isometric views of the present invention on one side of the vehicle for clarity.
Figure 10:
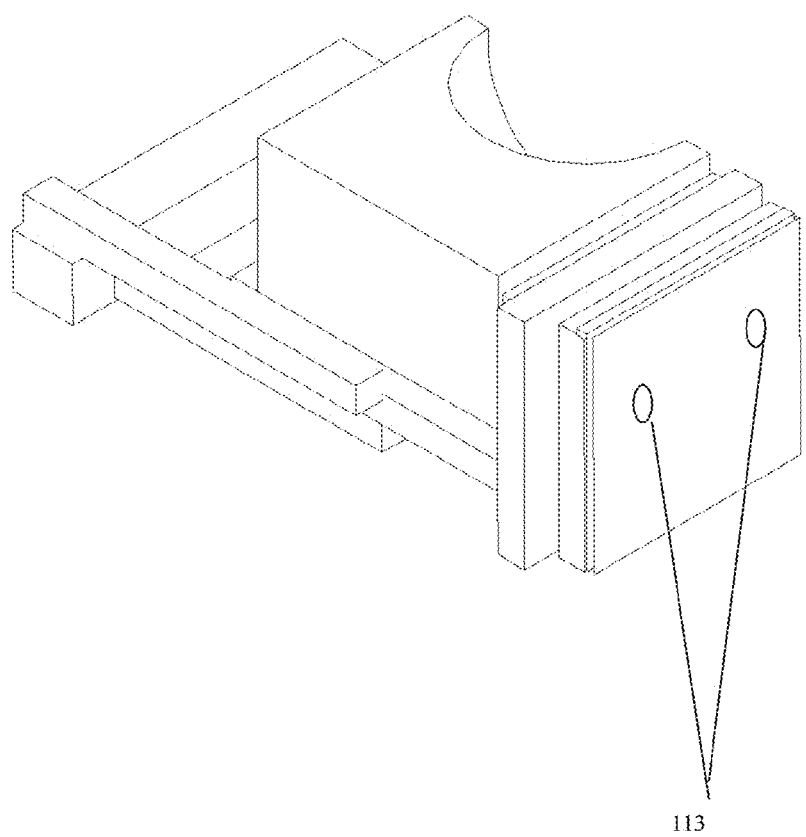
Figure 10:
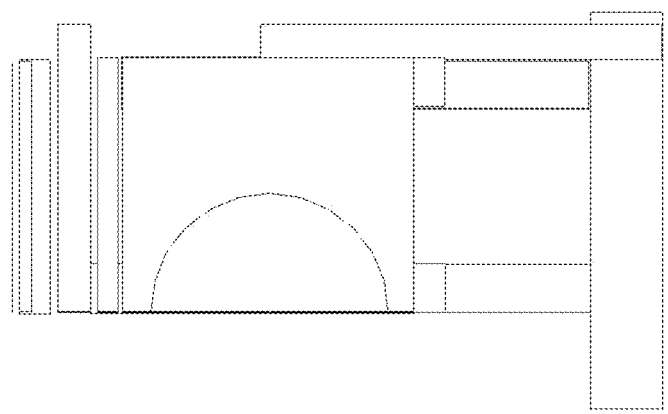
Figure 10:
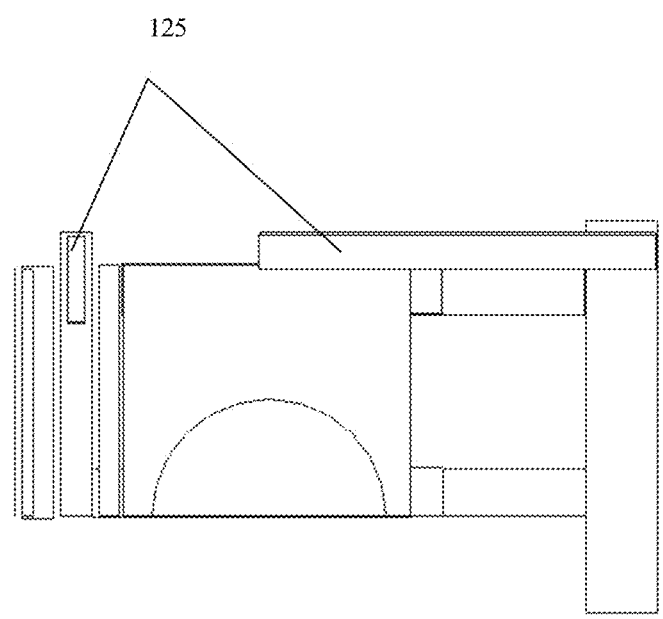

An auxiliary slide beam structure (108) (as illustrated in FIGS. 10A, 10B and 10C) may be attached to the central member of the Indo-skeletal beam (101) and locked into the protector shield when the vehicle is ready for operation, or be attached to the protector shield and slide out with the Safety beam upper element/upper primary slide (107), and get locked to the central member of the Indo-skeletal structure (101) in the operating position Means for access for passengers in this embodiment as illustrated in FIGS. 5, 6, 10A, 10B and 10C. The seat (109) and secondary slide (111), slide out on the upper Primary Slide (107) to a position that lets the seat (109) protrude from the vehicle such that the passenger may simply stand in front of the seat and sit down on the seat (109). Thereafter the seat (109) is retracted on the Primary slide to the position as depicted in FIG. 6, where the Safety beam upper element/upper primary slide (107) is locked with the locking devices (112) in position for operation of the vehicle. The slide drive mechanism may be powered using approaches well disclosed in the background art. The vehicle while in operation should have the Upper Primary Slide (107) retracted and locked. The ignition lock is used in this embodiment to ensure this practice.

While extended, the clearance on the side of the vehicle for the Easy Ejector will usually be in the range of about 20 inches to 30 inches. This could be substantially less than the clearance required for opening a conventional car door. This is particularly useful for parking in areas with limited clearance.

Figure 12:
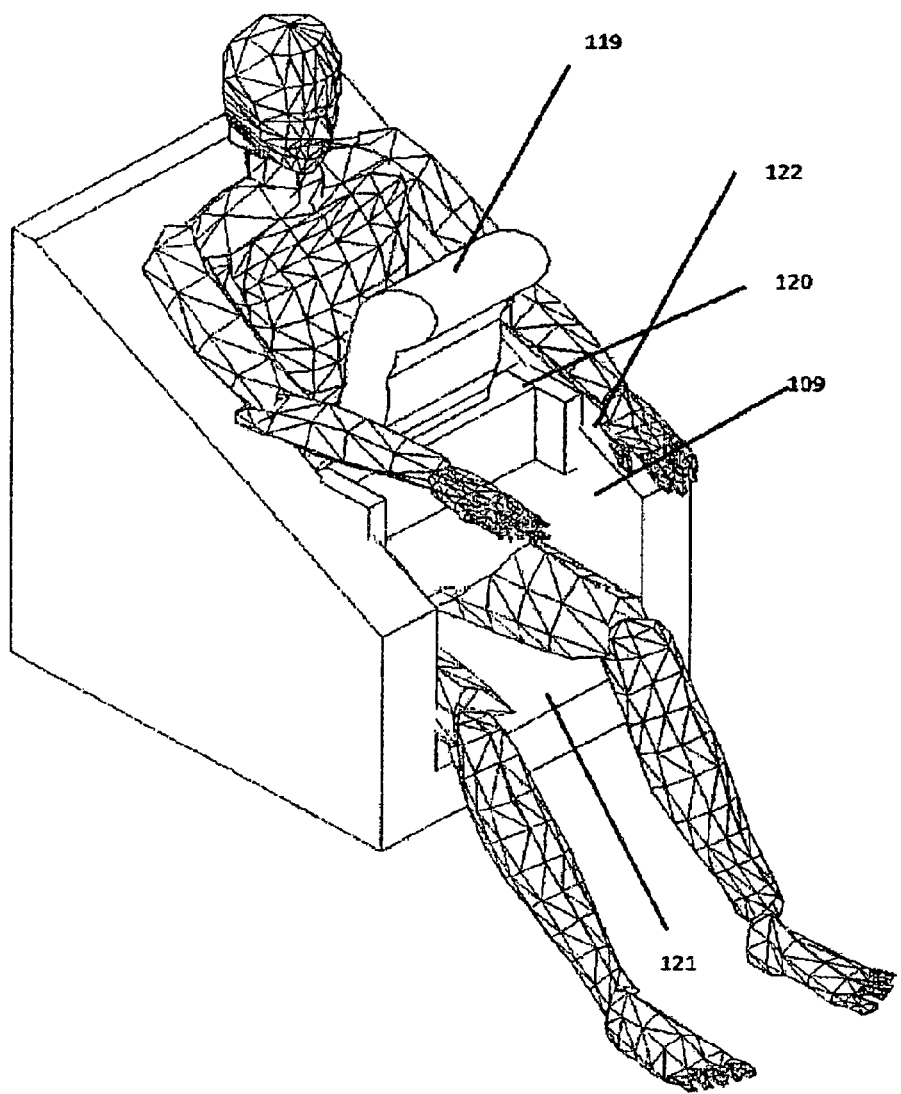
FIG. 12 D2 illustrates an embodiment of the child seat with corresponding scaled harness of 15A-C and 16 A-C in the embodiment of the adult seat.
Figure 12:
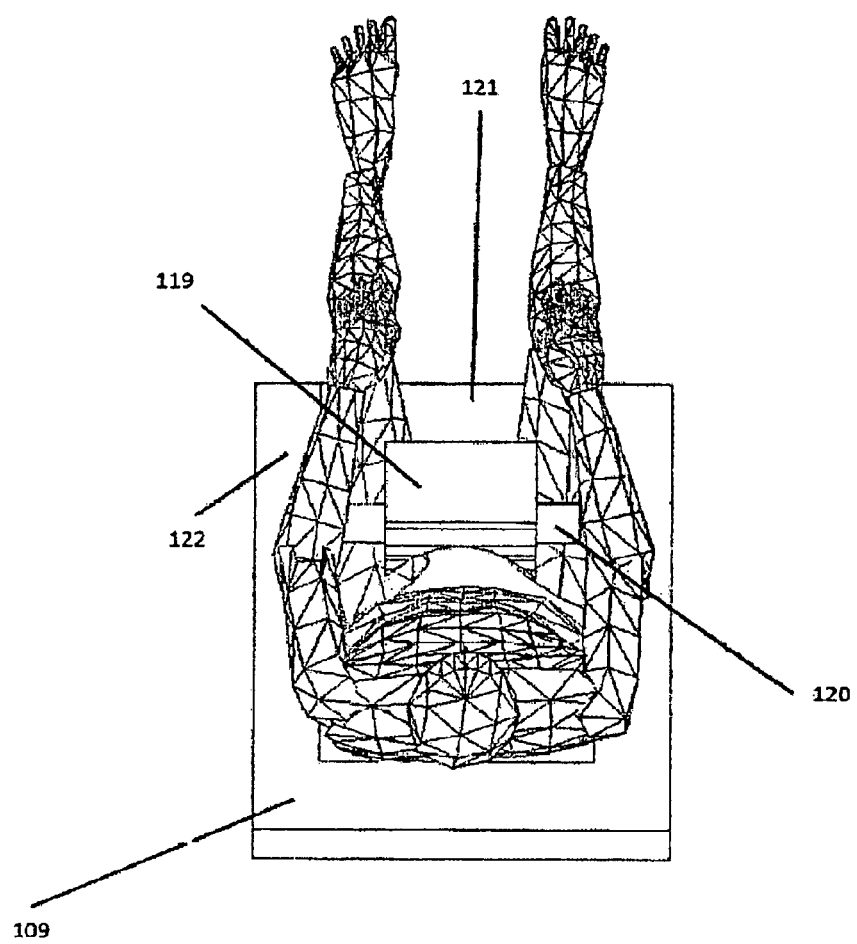
Figure 12C:
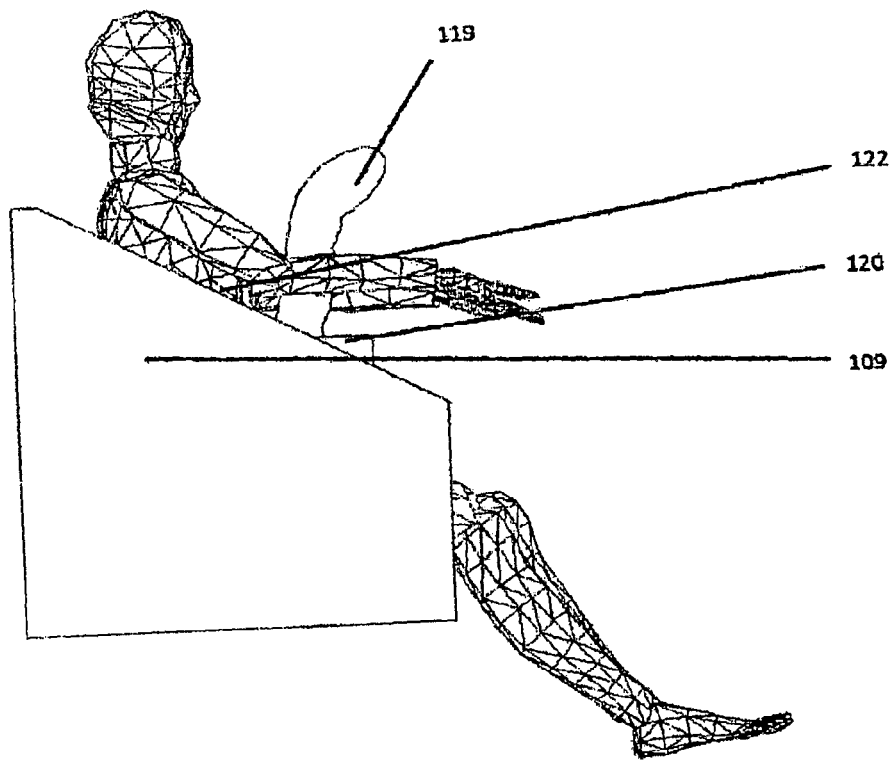
Figure 12:
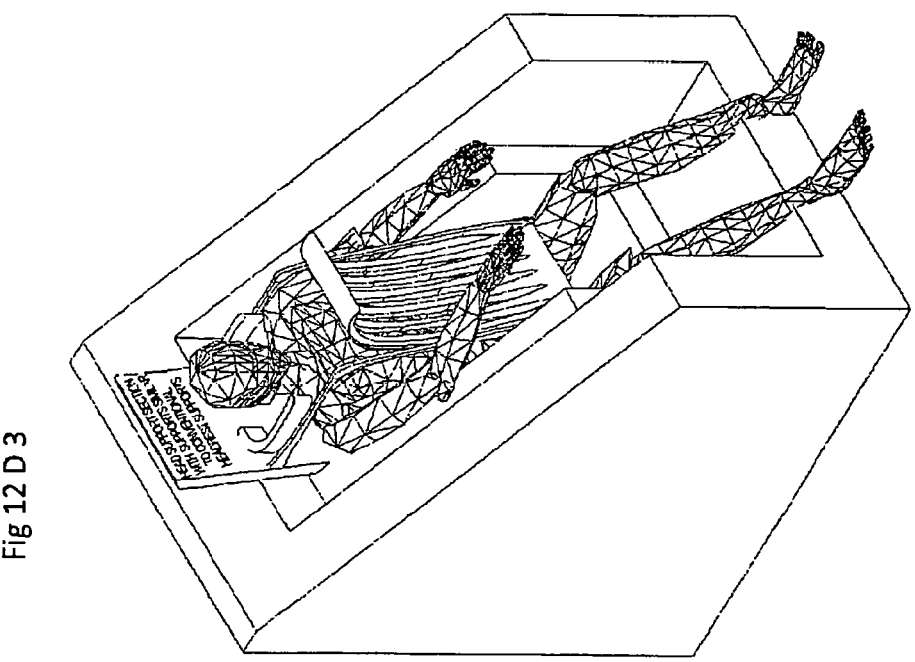
Figure 13:
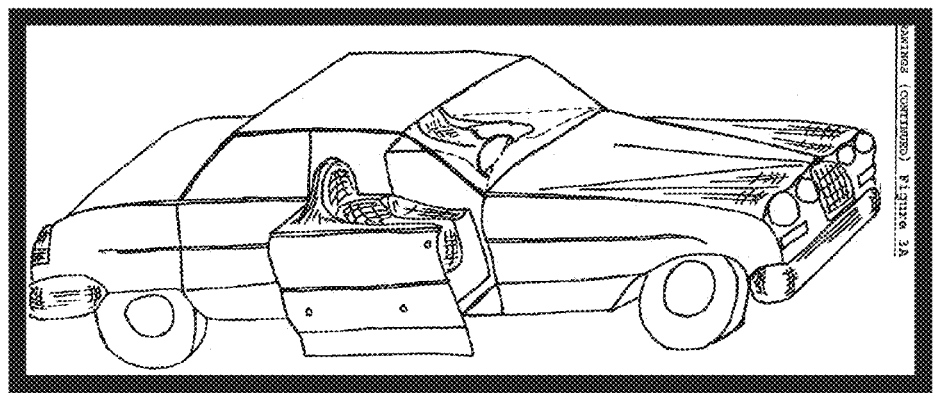
FIG. 13 is an illustration of a drawing of isometric view of the present invention.

FIGS. 12A, 12B and 12C illustrates the detail of the seat (109). The seat (109) may be constructed with customizable multi-elements that conform to the desired shape and provide the desired support for the passenger. Such adjustments may be effected using conventional seat control devices. In this figure the Safety Harness (119) is secured to the sides of the contoured seat (109) between the arm rests (122). The safety harness (119) may be designed to protect the passenger in head-on collisions by providing a soft barrier in close proximity to the body but not necessarily touching the body. This arrangement may be preferred to seat belts that do not provide the extended surface area that the harness (119) provides and as result provides greater impact resistance for the same level of limiting forces that the body can withstand. Moreover, this arrangement may obviate the need for a front collision airbag as the harness (119) may be high enough to support the face and neck under collision conditions. The harness may be constructed of pliable but semi-rigid material (such as high strength nylon) to provide support in a head on collision. A natural benefit of the arrangement of the harness (119) and its supports (120) is that lateral forces on the seat are also braced by the harness support (120) in the operating position. FIGS. 12F2 and 12G2 illustrate an embodiment of the harness. Moreover the (crush resistant) seat (109) may be constructed with lateral support elements (502) to provide crush or compression resistance and may be supplemented with reinforcing on the sides with reinforced seat sides (503) to further protect the passenger from crush injuries. The Seating surface (121) is illustrated in the same figure as are the arm rests (122). In conventional vehicle seat designs the door surface provides the only support on the external side surface which are usually limited to arm rests. This seat (109) provides surround support for the passenger particularly desirable on winding roads. The "Custom contoured seats" customized for each passenger may be created with a multi-element adjustable structure (the customized multi-elements)—manually with inserts or with computer controlled elements—that provide ergonomic passenger comfort providing where desired, lateral support in addition to the support that conventional seats provide, to cradle the entire lower body in the ejector seat. These adjustable multi-elements include a left support adjustable multi-element (504), a right support adjustable multi-element (505), a back support adjustable multi-element (506) and a bottom support adjustable multi-element (507). Similarly child seats (123) as in FIG. 12D1, may be designed to protect children. Such seats can be inserted into the seat (109). The Safety harness may also have an attachment for providing greater support for infants and small children.

Additional Embodiments

While the above embodiment uses a power slide drive, this embodiment differs in that a gravity slide drive is employed to move the slides for mounting the vehicle. FIGS. 7, 8 and 9 describe this arrangement. This embodiment differs in the preferred embodiment above in that the Safety Beam Lower element/Lower Primary slide (102) are pivoted at the Central member of the indo-skeletal structure with pivots (118). As shown in FIG. 7, this allows the lower slide to fall to a lower of two positions, that inclines the upper surface of the Safety Beam Lower Element/Lower Primary slide (102) adequately to allow the safety beam upper element/upper primary slide (107) to slide outwards to the loading position assisted by the weight of a passenger in the seat and the additional assistance of the Spring arrangement (115). The passenger may dismount from the vehicle when the slide is fully extended as shown in FIG. 7. Each side of the vehicle has independent slides and may be operated by passengers independently.

When the passenger dismounts from the seat the Safety beam upper element/upper primary slide (107) in its extended position moves to the higher of two positions about the Pivot (118) as illustrated in FIG. 8. This move inclines the Upper surface of the Safety Beam Lower Element/Lower Primary slide adequately to allow the weight of a passenger to work against the spring arrangement (115) and move the slide to the operating position. This move up of the Safety Beam Lower Element/Lower Primary Slide (102) may be effected by mechanisms well disclosed in the background art. The Slide as depicted in FIG. 8, is now ready for a new Passengers to mount. When the passenger sits on the seat (109), the weight of the passenger works against the spring mechanism (115) to move the slide to the operating position as depicted on the left hand side of the FIG. 9 and lock the slide in the operating position. The Safety beam upper element/upper primary slide may be unlocked by the passenger by depressing the Inside Door Open Button (116). Activating this button in addition allows the Safety Beam Lower Element/lower primary slide (102) to move and be locked to the loading inclination—the lower of two positions, and the Safety beam upper element/upper primary slide (107) is free to slide out with the passenger. At this point the arrangement has completed a fill cycle and is in the position depicted in FIG. 7.

The above cycle represents operation of the Gravity Slide Drive when there is a passenger in the seat (109) when the Slide moves to and from the operating position as on the left of FIG. 9. When a passenger dismounts however, and the Slide arrangement needs to be retracted without a passenger in the seat, the weight of the passenger is no longer available for aiding the motion of the slide to the operating position, and the slide must be pushed in against the action of the Spring Arrangement (115) and locked in place at the operating position. When a new Passenger wishes to mount the vehicle, he/she will press the Outside Door Open Button (117) which releases the catch that holds the Safety beam upper element/upper primary slide beam in place but does not affect the movement of the Safety Beam Lower Element/Lower Primary Slide (102) about its pivot (118). The seat as a result slides out on the Safety beam upper element/upper primary slide assisted by the Spring arrangement (115) to the position for mounting the vehicle as depicted in FIG. 7. The spring arrangement (115) is designed to be such that it provides a force just adequate to move the Safety beam upper element/upper primary slide out with no passenger in the seat.

Some alternative embodiments may have multiple positions for the inclinations of the safety beams from the center of the vehicle, in the loading position to accommodate the varying road inclinations that may make a single inclination of the safety beam in the loading position inadequate. In such an embodiment the operator will have the facility to switch to the best loading inclination dependent on the inclination of the road. This will overcome some of the disadvantages of regular car doors on steep hills. Moreover, this arrangement can also function as a shock absorbing device for the comfort of the passengers in vehicles under operating conditions. A possible embodiment to achieve this can have a range of angular inclinations for the operating position, the range being set so that the transfer of the compressive load on impact through to the fixed body members of the vehicle or the central beam is achieved. The Safety beams are spring or shock absorber mounted in a vertical plane relative to the central beam and the fixed body members of the vehicle. When a bump in the road is encountered the safety beams pivot on the center and swing higher at the center thereby isolating the passenger from the road.

Alternative Embodiments

In an alternative embodiment to the preferred embodiment, the present invention may use hinged Protector Shields (106) that lock into the Primary Slide (107) when closed. This will allow the arrangement to work for mounting and dismounting the vehicle with either the Primary Slides deactivated or non-operational as well as when they are functional. The seats may also be mounted on rotating mechanisms or extension arms rather than a primary slide, to assist passengers in mounting and dismounting.

Another alternative embodiment is illustrated in FIGS. 5A and 6A. The "door" that contains the perforation shield (105) with distance/velocity sensors (113), the external airbags (104), the shock absorbers (103) and the protector shields (106), hinges down on the pivot (112A) to provide support for the safety beam upper element/upper primary slide. The inner surface of the Protector shield is designed to perform the function of the Safety Beam Lower Element/lower Primary slide (102). This embodiment will be particularly useful for larger vehicles with a plurality of seats on each side of the vehicle. These multiple seats may be mounted on separate sections of upper primary and secondary slides.

Another alternative embodiment is illustrated in FIGS. 1D to 4D where the Shock Absorbers (103) excluding the External Air bags (104) are mounted on the inner surface of the protector shields (106). As may be seen from the drawings, in this particular embodiment, the shock absorber excluding the external air bags are locked directly to the Safety Beam Lower Element/lower primary slide (102) in the operating position, although in another configuration the locks may be between the protector shield and the lower primary slide in the operating position.

Another alternative embodiment may have a contoured safety harness with a different shape to that of the preferred embodiment. FIGS. 12A1 to 12C1 illustrate an embodiment of a safety harness using a slightly different geometry but performing the same function in the same way as in the preferred embodiment.

Figure 4C:
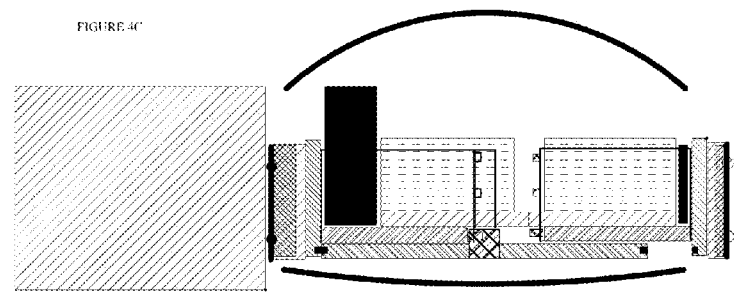

Another alternative embodiment may have an auxiliary slide behind the seat and of any convenient height. This embodiment is shown in FIGS. 1C-4C. The figures illustrate the working of the current invention with a high section of the central member of the indo skeletal structure behind the seats, but abutting the auxiliary beams in the operating position. As the High section of the central member (101) is behind the seats and the secondary slides (111), the seats and the secondary slides are free to move across the vehicle under impact as shown in FIG. 4C.

Yet another alternative embodiment has an external seat profile as illustrated in FIG. 12E1. The higher rectangular external profile provides greater protection to the passenger.

Yet another alternative embodiment has a vertical extension/"safety cage" (125) as shown in FIGS. 10A1, 10B1 and 10C1. Here the vertical extension/safety cage engages a beam across the top of the vehicle that may be supported by the shell structure of the vehicle (the figure shows only half the width of the vehicle). Such a safety cage/vertical extension can provide protection in a roll over situation and also provide additional compressive strength for the vehicle, and may function as a fixed or retractable roll bar. In some embodiments such a vertical extension "safety cage" will perform the function of the "B" pillar of the vehicle under lateral impact. Notably no "B" pillar is needed to support rear door hinges in the present invention. Moreover, in some embodiments the beam arrangement across the top of the vehicle or other support structures on the roof section of the shell may be designed to be rigid on compression but telescope out with the secondary slides under impact using appropriate logic to drive the locking mechanisms, thereby providing a protective cage even when the seat is in the ejected state.

Yet another embodiment, deters a roll over following side impact, by implementing an "outrigger" arrangement having reinforced safety beam upper element/upper primary slides (with appropriate reinforcing (510) and/or secondary slides and bracing brackets (512) anchored to the fixed members of the vehicle that hold these slides in their extended substantially horizontal position after extension under impact—such as with reinforcing to safety beam lower elements (511)—without permitting them to buckle under vertical forces encountered under the initial stage of a roll over situation.

The preferred embodiment has the external airbags or shock absorbers triggered on detection of an expected impact as noted. This implies that on the far side (non-impact side) if there is possible secondary impact from a second object, the same mechanisms will deploy the external airbags on the second side, thereby protecting the far side occupant in the event of a second object hitting the vehicle soon after the first. An alternative embodiment can have distance/velocity sensors mounted in positions on the front and back edge of the perforation shields or protector shields to facilitate better detection of objects approaching the vehicle at wide angles to the perpendicular direction. Yet another alternative embodiment to this will have both impact side and far side external airbags deploy on detection of the first impact.

Another alternative embodiment has a safety harness/shield as illustrated in FIG. 12H2. This embodiment of the safety harness is mounted on spring loaded hinged supports (137) at the head support section of the multi element adjustable seat—similar to conventional supports for the headrest, and to lockable supports (138) between the arm rests or on the side bolsters of the multi element adjustable seat. The spring loading will support the weight of the harness and thereby retract the harness when unlocked. The harness includes a hinged and spring mounted shield (130) that may pivot on the lower safety harness support (138), The passenger side of the shield, has on its surface an implementation of a Passive Air Cushion System that uses the pressure in one or more sacrificial chambers which under pressure transfer air to one or more micro-air cushions that protect high priority anatomical regions. In this embodiment, the passive anatomical micro air cushion (131), derives it inflation source from the sacrificial chamber (139) at the lower end of the shield of the safety harness, that is compressed by a much greater body mass under impact. In a frontal collision the force of the more massive parts of the body on the sacrificial chamber will deploy the passive anatomical micro-air cushions to protect the face and the neck. The narrower sections of the aircushions and flow control mechanisms if installed, will cause some viscoelastic behavior and in addition cause air speed amplification to create faster deployment. While this mechanism activates the shield (130) may pivot down to take some of the impact energy. The shield is shaped to the contour of the human body head and neck when it is forced forward as in a frontal collision. This embodiment may in addition have multiple or variable position harness support anchor points on the arm rests or the side bolsters that are part of the multi-element seat, to accommodate people of different proportions. Moreover this embodiment may have in addition an additional bracket that moves the anchor point of the lower safety harness locking supports substantially forward, and provides a supplementary passive anatomical micro-air-cushion that can be mounted on the permanent micro-air-cushion on the shield, to accommodate pregnant women, and the special critical force distribution they can withstand.

In this embodiment, the two pivoted arms swing forward under collision forces the moment created by the shield with the body pressure against it, and extends the upper extending arms (133) to absorb some of the shock and to provide a space for the forward movement of the upper body. The elbows (132) facilitate the relative angular movement of the upper arms and lower arms of the safety harness (133,134). They are spring loaded to ensure that they support the lower parts of the harness when unlocked to allow the entire harness to move up and away from the body when unlocked without any force being applied. Under side impact the passive anatomical head and neck micro-air-cushions deploy to protect the head and neck under relative lateral acceleration. Notably the passive anatomical head and neck micro-air-cushions can be actively deployed or as in this embodiment passively deployed by a discharge of air from sacrificial chambers between the seats or on the outer surface of the seats and mounted on each of the seats, so that lateral pressure will inflate the anatomical head and neck micro-air-cushions. The sacrificial chambers offer secondary impact protection by cushioning the seat. Notably this embodiment does not use any active airbags in the vicinity of the human body, reducing the risks associated with the high energy external deployment devices. The adjustable head rest (136) follows conventional design but is here mounted on the safety harness hinged mounts.

Figure 17:
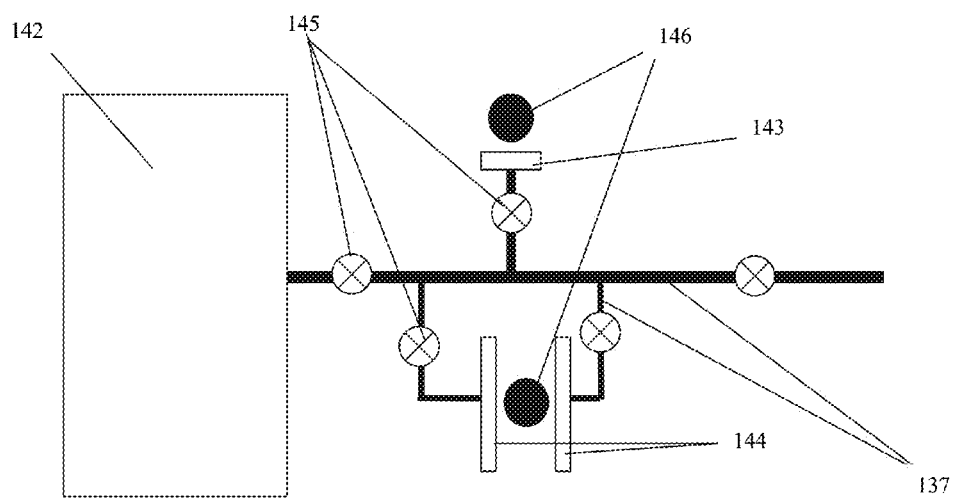
FIGS. 17A and 17B show a schematic diagram of the passive air cushion system disclosed in this invention.
Figure 17:
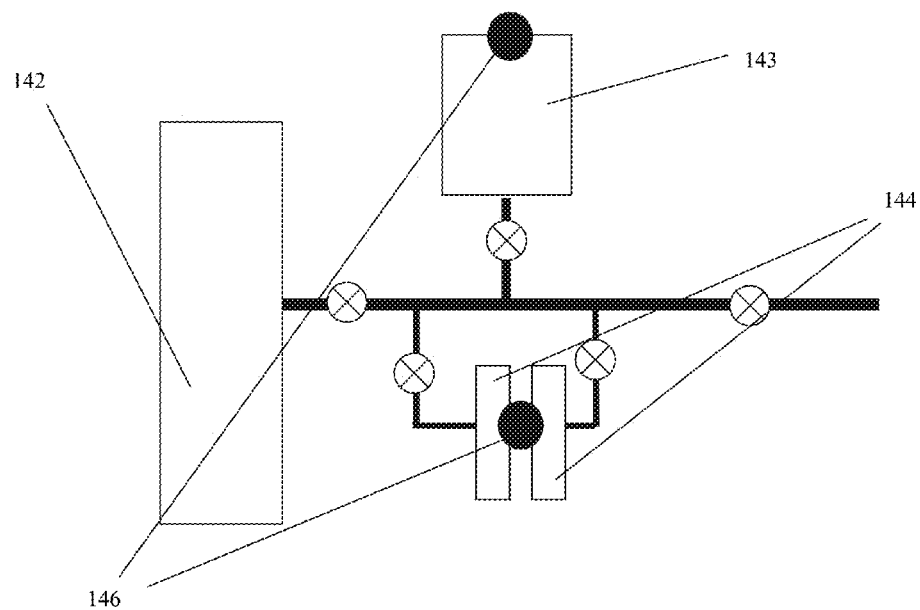

FIG. 12I2 shows the passive anatomical micro-air-cushions deployed (the sacrificial chamber has been compressed and the top region is full and ready to protect the face and neck in a frontal impact. FIG. 12J2 shows the anatomical head and neck passive micro aircushions deployed under side impact, ready to support the head and neck in a side collision. Notably this embodiment uses a new concept where the impact energy is redeployed for protecting vital parts of the impacted object which are often embedded inside the object, using fluid transfer—in this case air transfer. Force and velocity amplification or deamplification can be achieved with the geometry of the interconnections, the sacrificial chambers and the micro-air-cushions. The sacrificial chambers can be used for secondary impact protection as well by carefully controlling the flow parameters. This is illustrated in FIG. 17. The approach obviates the need for active airbag technologies in the vicinity of sensitive equipment, living organisms and indeed people.

Figure 16:
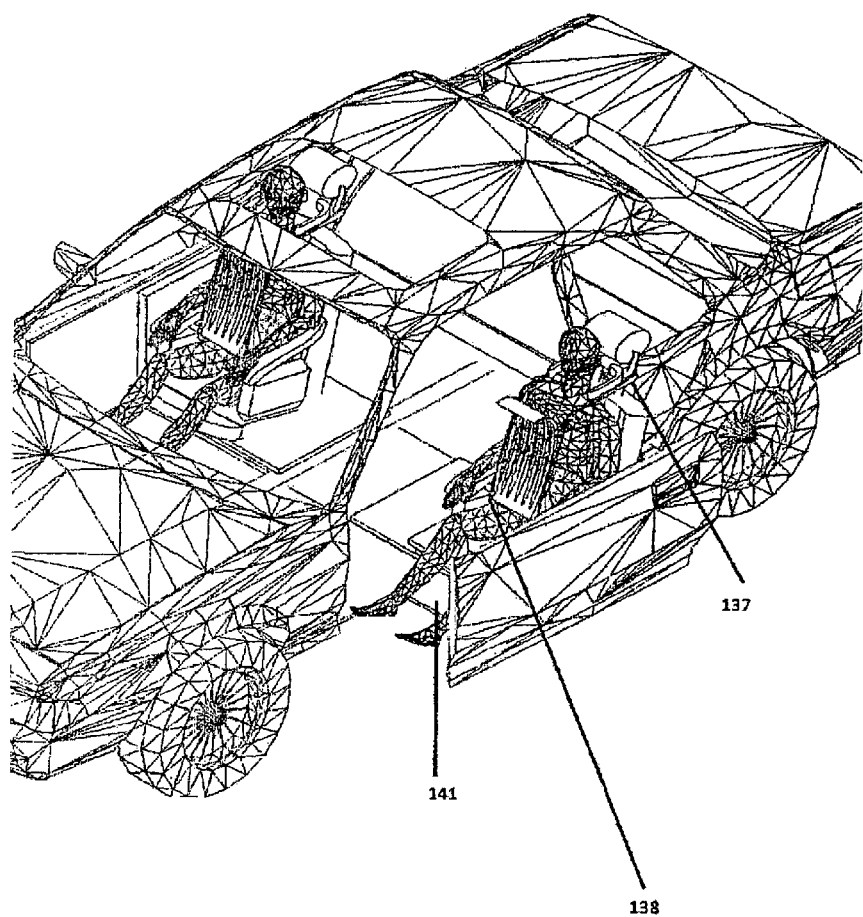
FIG. 16A illustrates a passenger ready to leave the vehicle. The safety harness/shield is still in place.
FIG. 16B shows the passenger in FIG. 16A after releasing the safety harness/shield from the locks.
FIG. 16C shows the same passenger in 16A,B but with the safety harness/shield now well above the head so that the passengers leave the vehicle by simply standing up.
Figure 16B:
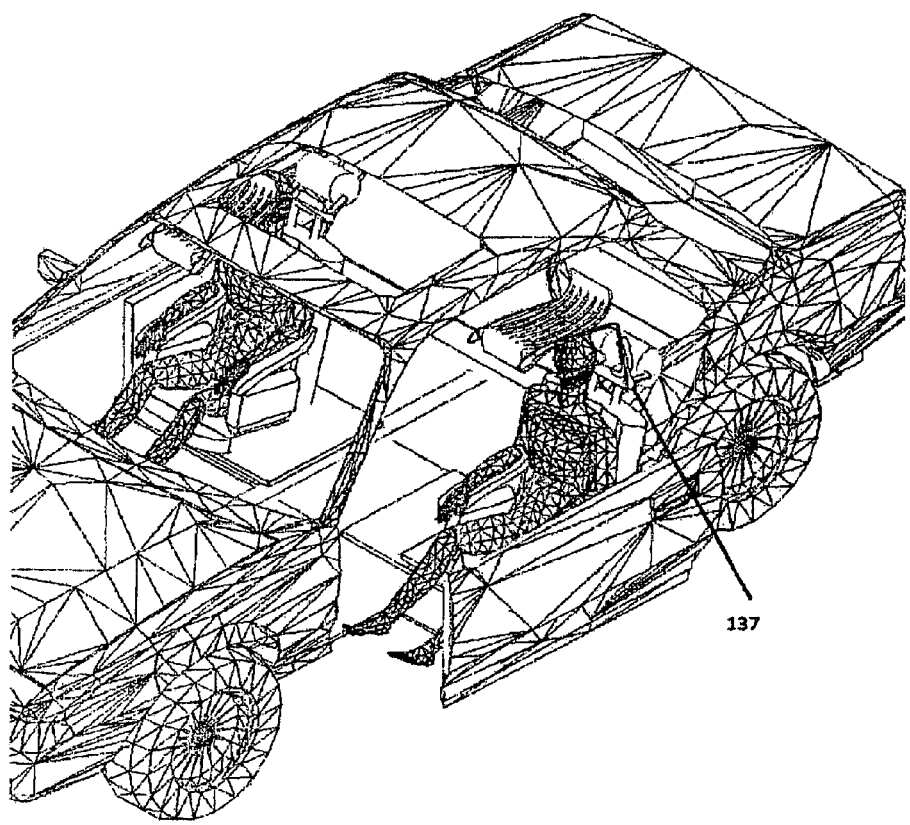
Figure 16:
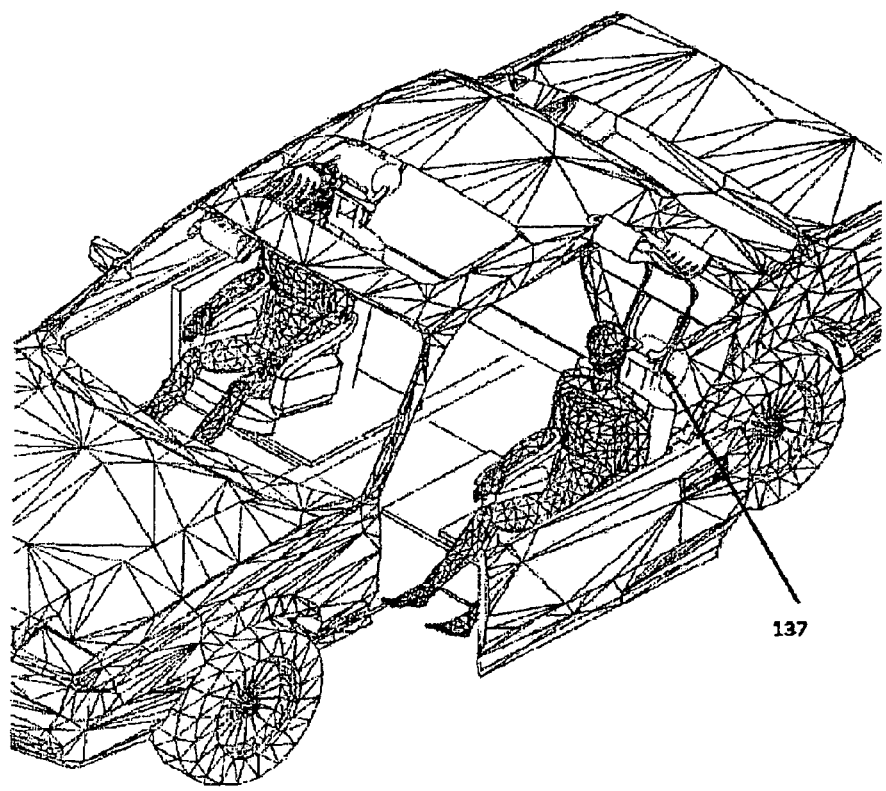

This embodiment of the harness allows movement within the vehicle for passengers when it is unlocked and allowed to swing up within the vehicle as shown in FIG. 16D. However, visibility is somewhat obstructed preventing the driver from driving without locking the harness in place.

In this embodiment of the safety harness entering and leaving the vehicle are facilitated by the entire device swinging away from the body as shown in FIGS. 16A, B and C. The passenger simply needs to stand up to leave. To enter the passenger simply sit down and place his/her feet on the foot rest (141) and retract the slider mechanism. This embodiment also has radar or infrared detectors as on elevator doors to detect limbs in the way of the retracting sliding mechanism for the protection of the passengers—passenger protection detectors (513).

FIG. 15C shows the parts of this embodiment and the adjustable arm rests.

Another embodiment of the shield on the safety harness has a folding section at the top that can be straightened and locked in place for adults and folded down for children.

Another embodiment uses flexible netting on part of the shield surface to protect passengers under impact—a Net structure for Harness (514). In this embodiment, the shield has a frame on which the netting is deployed—a frame for Net structure for Harness (515). The upper end of the frame is adequately bent forward and then downwards to ensure that the passenger head and neck do not strike the frame under frontal collision. In yet another embodiment of this arrangement, the shield of flexible netting is designed for the head and neck and is normally retracted forward, and deployed on impact by initial forces by the lower torso of the passenger against the lower part of the safety harness/shield.

Yet another variation of this safety harness with netting on a frame, has telescoping frame members on the sides so that the height of the frame is adjustable by retraction of the telescoping members to accommodate children and small adults.

Another embodiment has air conditioning micro-ducts on the seating surfaces and the safety harness/shields, for the comfort of passengers, particularly in open vehicles.

Another alternative embodiment has the "Open" switch for the slide on the inside of the vehicle designed the "press bar" so that the intuitive reaction of the passenger to "open the door" is harnessed. However, this can be deactivated when the vehicle is in motion.

Another alternative embodiment has a center console that is designed to crush under impact as shown in FIGS. 1F-4F, thereby minimizing the ejection of the far side passenger on impact.

Another alternative embodiment has the internal airbag partially filled at all times, so that in the event of no deployment of the external airbags either because of technology failure or non installation or other reason, the passenger and seat arrangement are cushioned even prior to further inflation of the internal airbag on deployment on impact. Shock absorbers may supplement the operation of the internal airbags in this embodiment with partially inflated internal airbags under normal operating conditions.

Another alternative embodiment can have the internal airbags deployed on impact as noted with such deployment effected by inflation by some of the compressed air of the external airbags on impact, thereby providing "acceleration de-amplification" for the movement of the passengers on impact.

Yet another embodiment has proactive sensors deploying the internal airbags directly, without the installation of external airbags.

Yet another embodiment of the invention has a retracting canopy stored in the roof of the vehicle, and attachable to the protector shield or attached components such as the side window, when desired. When attached, the canopy will deploy over the seats when in the extended or loading positions, thereby protecting the seat and the passenger from rain or other snow while entering or leaving the vehicle.

Yet another embodiment has external airbags constructed using the Passive Air-Cushion System with micro chambers that are connected to each other by restricted paths that provide visco-elastic energy absorption in the event of some sections of the airbag being impacted while others are not, thereby forcing air from the compressed micro chambers to the other micro chambers, each of the micro chambers functioning as either a sacrificial chamber or a Micro Air Cushion on impact. This embodiment may of course have external airbags proactively deployed in the manner described herein, prior to impact and their performance as Micro Air Cushion systems. Yet another variation may include one way valves between the chamber directly connected to the inflation source and each of the micro-chambers (implementable for example with flaps against an aperture) so that inflation may be achieved rapidly, and then the Passive Air-cushion benefits realized on impact.

Yet another embodiment uses the Passive Air-cushion system to protect passengers from "Whip-lash" injury, by providing Micro Air-cushions in the vicinity of the head and neck, and providing sacrificial chambers that are compressed in the event of a rear end collision. In some embodiments the sacrificial chamber can be mounted below the seat with one face mounted to the vehicle structure and the other face mounted to the seat of the passenger, the seat being mounted to the support structure to allow controlled limited rearward movement relative to its mountings to allow compression of the sacrificial chamber by the inertial mass of the passenger and seat on impact.

Yet another embodiment utilizes multiple adjoining but separate Passive Air-cushion systems where one such system connects the external airbags (sacrificial chambers) with internal airbags (micro Air-cushions), and another such system connects different and distinct internal airbags (sacrificial chambers) to micro Air-cushions in the vicinity of the passenger's body, thereby creating a cascading system of Passive Air—cushion systems. These embodiments may of course have external airbags proactively deployed in the manner described herein, prior to impact and their performance as Micro Air Cushion systems.

Yet another embodiment utilizes an auxiliary brake attached to the secondary slides in addition to the friction limited sliding arrangements of the secondary slide, to provide a further control on the rate of movement of the secondary slide under side or lateral impact.

Yet another embodiment utilizes a foot safety switch attached to the foot rest, that activates the sliding mechanism to move the sliding seats into and out of the vehicle. The foot rest in some such embodiments may be bar that is depressed to move the slide into and out of the vehicle. These foot rests being designed to avoid ankle injuries in the event of rear collisions sustained by the vehicle.

Yet another embodiment uses supplementary porous filling materials within prefilled internal airbags designed with suitable vents to change the compression characteristics of the inside airbags under impact.

Yet another embodiment utilizes pressure memory capable materials on the surface of the seats or passenger supports so that surround seats contour to the exact shape of the body for further comfort of passengers and also better support under collision conditions.

Yet another embodiment has anatomical micro-aircushions on the left and right edges of the support surface of the safety shield connected to selected sacrificial chambers along the bottom edge of said support surface. This will provide additional support for the passenger in a side impact, by assisting in preventing body movement outside the contoured seat under collision conditions.

Yet another embodiment has anatomical micro-aircushions on the outer edges of each of the contoured seats, particularly to cover a part of the front of the shoulders the legs and torso in the event of a side collision. These anatomical air-cushions use sacrificial chambers on the sides of the seats.

Yet another embodiment has multiple pairs of customizable multi element seats (passenger support mechanisms or PSMs) on each of one or more lateral axes such as in a bus. In this embodiment, the pair of passenger support mechanisms nearest the center of the vehicle constitute the innermost pair and the pair that is closest to the outer sides of the vehicle constitute the outermost pair. The outermost pair of PSMs may have an protector shield and internal and external airbags mounted on it for the protection of passengers and disclosed elsewhere in this invention. In this embodiment, each of these PSMS are supported by impact decoupler/secondary slides that are normally fixed to safety beam upper elements that are in turn slidably mounted on one of the safety beam upper elements. The safety beam upper elements are normally locked to the safety beam lower elements in the operating position and therefore do not normally slide in the operating position. However for egress and ingress the safety beam upper elements may slide on the safety beam lower elements to provide egress and ingress access to the occupants. In the event of a lateral impact, the impact decoupler/secondary slides decouple from the safety beam upper elements and allow each of the PSMs on their respective secondary slides to slide on the safety beam upper element. It is also possible the safety beam lower element on the side away from the impact to guide the safety beam upper elements, if they need to traverse the center of the vehicle. The design of fixed elements in the vehicle is such that these fixed elements do not obstruct the motion of the PSMs and the attached components as disclosed above during collision conditions. This embodiment is therefore similar to embodiments with one PSM on each side of the vehicle on a lateral axis except that the multiple PSMs are protected.

Yet another embodiment has safety beam upper element constructed as a plurality of slidably attached elements, such that each of the elements have a limited sliding range relative to the adjoining elements, and wherein the first of these elements is fixedly attached to the safety beam upper element and the last of these sliding elements is fixedly attached to the second face of the safety beam upper element. This arrangement is much like the slide support for a filing drawer and provides greater movement for the passenger support mechanism in particular for egress and ingress.

Conclusions, Ramifications & Scope

Thus it will become apparent that the present invention presented, provides a new paradigm for implementing key safety features and providing utility in accessing passenger vehicles and comfort in travelling in such vehicles. While the above description provides many specificities, these should not be construed as limitations on the scope of the present invention, but rather as an exemplification of the preferred, an additional and an alternative embodiment thereof. Many other variations are possible.

The present invention provides an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. Furthermore, the arrangement allows the installation of a new and unique safety harness that may obviate the need for safety belts and front impact airbags for protection in head-on collisions. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-a-vis the remaining mass of the vehicle. Furthermore the present invention differs sharply from the Background art in that the resulting structure synergistically permits the installation of contoured multi-element surround seats that would not be implementable without the slide arrangements on either side of the vehicle in the present invention.

The present invention provides a gravity slide drive for my arrangement for which there is no counterpart in the Background art. This allows further Utility and weight and energy saving in implementing the above elements of the present invention.

The present invention includes External side Airbags that differ sharply from the Background art in that for the first time they proactively create a "Just in Time" deceleration zone for the lateral or side impact with internal and/or external side airbags while not remaining in an extended position under normal operating conditions of the vehicle.

The present invention describes an indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

The invention claimed is:
1. A child seat for use in a vehicle comprising:
   a first airbag configured to protect an occupant during side impact to the vehicle, prefilled with air supplemented with a porous filling material within, and having a plurality of vents configured to evacuate said air at a controlled rate upon impact during side impact to the vehicle;
   wherein said porous filling material comprises a foam pad;
   wherein said airbag is constructed with a flexible membrane adjoining said foam pad;
   wherein said plurality of vents comprise perforations on said flexible membrane;
   wherein an inertial loading of the occupant on the airbag compresses the foam pad and exhausts air through the perforations on said flexible membrane during lateral inertial loadings by the occupant;
   wherein said first airbag pre-filled with air and with said porous filling material comprising a foam pad within is enabled to cushion an occupant ahead of impact to the vehicle, by releasing air through said perforations in said flexible membrane during transient inertial loading of the airbag by the occupant, and absorbing air through perforations upon expansion of said foam pad;
   wherein the seat is configured to be removably attached to the vehicle;
   wherein the seat is configured to support a child;
   wherein the seat is configured to provide lateral support to the child;
   and wherein said supplementary porous filling material comprising a foam pad within, and plurality of vents comprising perforations in the flexible membrane enable adjustment of compression characteristics during impact of said first airbag to protect the occupant during inertial loading of the occupant under side impact conditions to the vehicle.

2. The child seat of claim 1, wherein the seat further comprises a second airbag and a first side and a second side, and wherein the first airbag is located along the first side, and the second airbag is located along a second side.

3. The child seat of claim 2, wherein the first and second airbags are configured to be located proximate an occupant's head or neck.

4. The child seat of claim 2, wherein the first airbag is attached to a first headrest and the second airbag is attached to a second headrest.

5. The child seat of claim 2, further comprising a third air configured to be located proximate to and behind an occupant's head.

6. The child seat of claim 1, enabled to utilize impact energy of an inertial loading on the first airbag to cause first airbag to act as a sacrificial chamber, to protect a predetermined region of the occupant wherein the first airbag is connected to transfer air to inflate an air-cushion configured to be located in a vicinity of the predetermined region for protection of the occupant with a support surface of said aircushion.

7. The child seat of claim 1, wherein the first airbag releases air following compression, into an air cushion.

8. The child seat of claim 7, wherein:
   pillow pads comprise a combination of the first airbag and the air cushion;

said pillow pads are supported in a head support assembly slidably attached to a seat back of said child seat, and with wings configured to straddle a head and neck of the occupant to provide protection to the occupant during side impact.

9. The child seat of claim 7, wherein the air cushion is designed to cushion the head of an occupant.

10. The child seat of claim 1, wherein the first airbag is one or both of: configured in an anatomically appropriate shape; and has an adjustable vertical position.

11. The child seat of claim 1, wherein the force of an occupant's head against the first airbag during impact forces air out of at least some of the plurality of vents.

12. An airbag for use in a child seat in a vehicle:
wherein the seat is configured to be removably attached to the vehicle;
wherein the seat comprises first and second sides;
wherein the seat comprises a shell, configured to partially surround the occupant and comprising a first support element and second support element on the first and second sides respectively configured to provide lateral support;
wherein the first support element and the second support element are contiguous with a bottom support element and a back support element to cradle a lower body of the occupant with support;
and wherein said airbag is prefilled with air supplemented with a porous filling material within and further comprising:
a plurality of vents configured to evacuate said air at a controlled rate upon a force of impact of an occupant's head during impact to the vehicle;
wherein said porous filling material comprises a foam pad;
wherein said airbag is constructed with a flexible membrane adjoining said foam pad;
wherein said plurality of vents comprise perforations on said flexible membrane;
wherein the inertial loading of the occupant compresses the foam and exhausts air through the perforations during lateral inertial loadings by the occupant;
wherein said airbag pre-filled with air and with said porous filling material comprising a foam pad within is enabled to cushion an occupant ahead of impact to the vehicle, by releasing air through said perforations in said flexible membrane during transient inertial loading, and absorbing air through perforations upon expansion of said foam pad;
wherein said supplementary porous filling material comprising a foam pad and plurality of vents comprising perforations in the flexible membrane enable adjustment of compression characteristics of said airbag to protect the occupant during impact to the vehicle;
and wherein the airbag is configured to be located proximate a side of the occupant's head.

13. The airbag of claim 12, wherein the airbag is located along a side of the child seat in a pillow pad supported by a headrest assembly with a wing on one of said first and second sides of the seat.

14. The airbag of claim 12, enabled to utilize impact energy of an inertial loading on the airbag to cause said airbag to act as a sacrificial chamber, to protect a predetermined region of the occupant wherein the airbag is connected to transfer air to inflate an air cushion configured to be located in a vicinity of the predetermined region for protection of the occupant with a support surface of said aircushion.

15. The airbag of claim 12, wherein the airbag releases air following compression into an air cushion.

16. The child seat of claim 15, wherein a combination of the airbag and the air cushion provide protection to the occupant under side impact conditions.

17. A passive air cushion system comprising:
a child seat configured to be removably attached to a vehicle, and configured to support a child;
wherein the child seat includes first and second sides configured to extend on either side of the head and neck of the child;
a first air cushion attached to the first side and a second air cushion attached to the second side;
a slidable mechanism mounted on said child seat to adjust the height of a head restraint assembly with the first and second air cushions;
wherein the first and second air cushions are each prefilled with air supplemented with a porous filling material within, and each include a plurality of vents configured to evacuate said air at a controlled rate upon the force of impact to an occupant's head during side impact to the vehicle;
wherein the first and second air cushions pre-filled with air and porous filling material are enabled with said air and porous filling materials to cushion an occupant ahead of impact;
and wherein the system is configured to protect a child's head and neck under side impact conditions to the vehicle.

18. The system of claim 17:
wherein the child seat is configured to at least partially surround a child occupant;
wherein the first air bag adjustably mounted on said adjustable head restraint;
wherein the child seat is configured to provide lateral support to the child;
wherein the first air cushion is configured to release air upon compression into a third air cushion to protect an occupant's head.

19. The system of claim 17;
wherein the first side and second side are each configured to extend lateral to and alongside the child's head;
wherein said porous filling material comprises a foam pad;
wherein said airbags are constructed with a flexible membrane adjoining said foam pad;
wherein said plurality of vents comprise perforations on said flexible membrane;
wherein the inertial loading of the occupant compresses the foam pad and exhausts air through the perforations on the flexible membrane during lateral inertial loadings by the occupant.

* * * * *